US005485208A

United States Patent [19]
Mabuchi et al.

[11] Patent Number: 5,485,208
[45] Date of Patent: Jan. 16, 1996

[54] CAMERA SYSTEM

[75] Inventors: Toshiaki Mabuchi, Tokyo; Yoshikazu Nishikawa, Kanagawa, both of Japan

[73] Assignee: Canon Kabushiki Kaisha, Tokyo, Japan

[21] Appl. No.: 305,429

[22] Filed: Sep. 13, 1994

Related U.S. Application Data

[63] Continuation of Ser. No. 191,711, Feb. 3, 1994, which is a continuation of Ser. No. 67,488, May 25, 1993, abandoned, which is a continuation of Ser. No. 970,286, Nov. 2, 1992, abandoned, which is a division of Ser. No. 711,124, Jun. 6, 1991, Pat. No. 5,161,026, which is a continuation of Ser. No. 587,001, Sep. 24, 1990, abandoned.

[30] Foreign Application Priority Data

| Sep. 27, 1989 | [JP] | Japan | 1-253392 |
| Feb. 26, 1990 | [JP] | Japan | 2-046283 |
| Feb. 26, 1990 | [JP] | Japan | 2-046284 |
| Jul. 10, 1990 | [JP] | Japan | 2-183171 |

[51] Int. Cl.$^6$ .................................................. H04N 5/30
[52] U.S. Cl. ................................................................ 348/335
[58] Field of Search .......................... 359/554–557; 354/286, 410–412, 419–423, 430, 202, 70; 348/335, 345–347, 360–368

[56] References Cited

U.S. PATENT DOCUMENTS

| 4,466,019 | 8/1984 | Sakashita | 358/225 |
| 4,518,239 | 5/1985 | Tomori | 358/225 |
| 4,527,205 | 7/1985 | Konishi | 358/909 |
| 4,589,750 | 5/1986 | Tomori et al. | 358/228 |
| 4,841,327 | 6/1989 | Yamamoto et al. | 354/412 |
| 4,860,113 | 8/1989 | Miyamoto et al. | 358/909 |

Primary Examiner—Stephen Brinich
Attorney, Agent, or Firm—Robin, Blecker, Daley & Driscoll

[57] ABSTRACT

A camera system, which control the function of a lens assembly on the basis of control information serially transmitted from a camera assembly, is provided with a communication circuit which effects communication of the control information and which is capable of changing the number of communication words associated with the communication, and a circuit for transmitting, if the number of communication words is changed, the changed number of communication words from the camera assembly to the lens assembly.

34 Claims, 19 Drawing Sheets

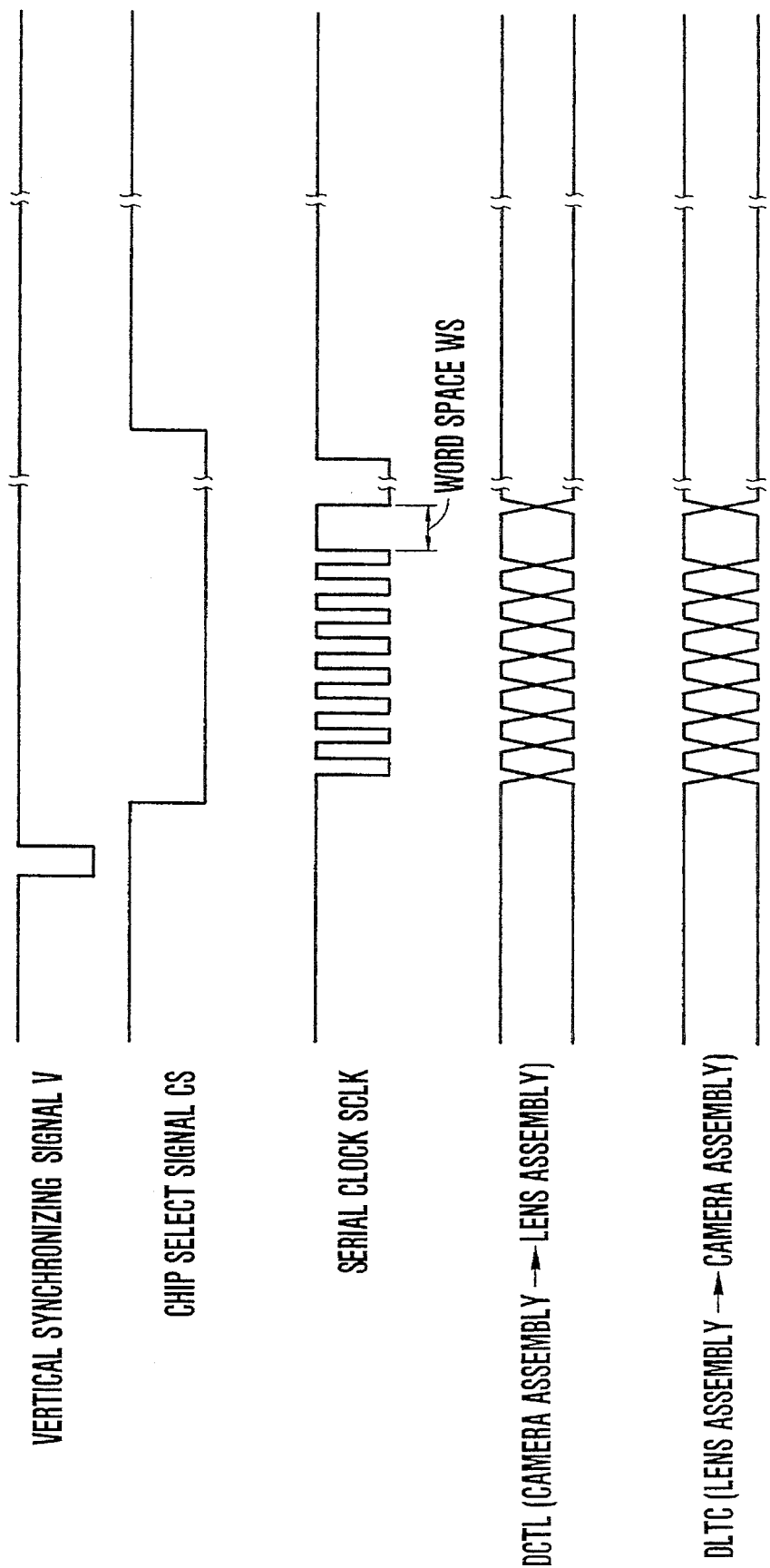

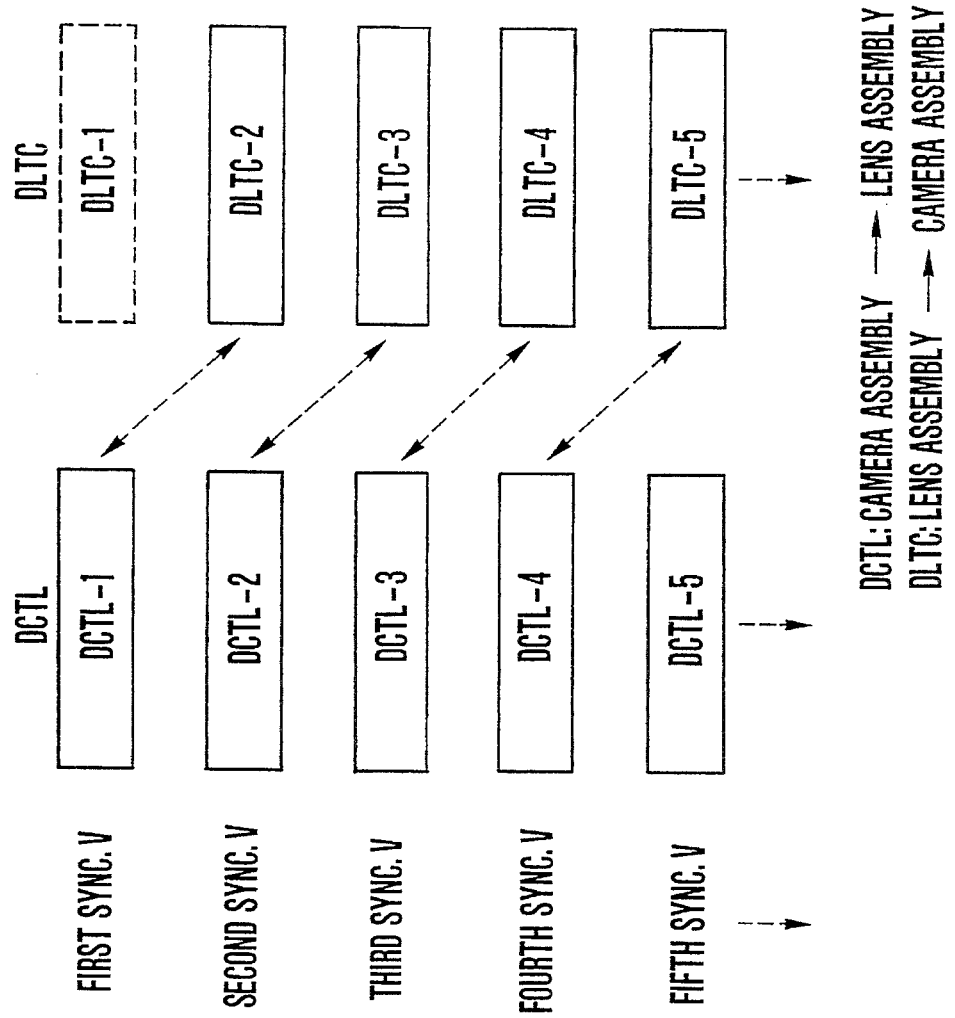

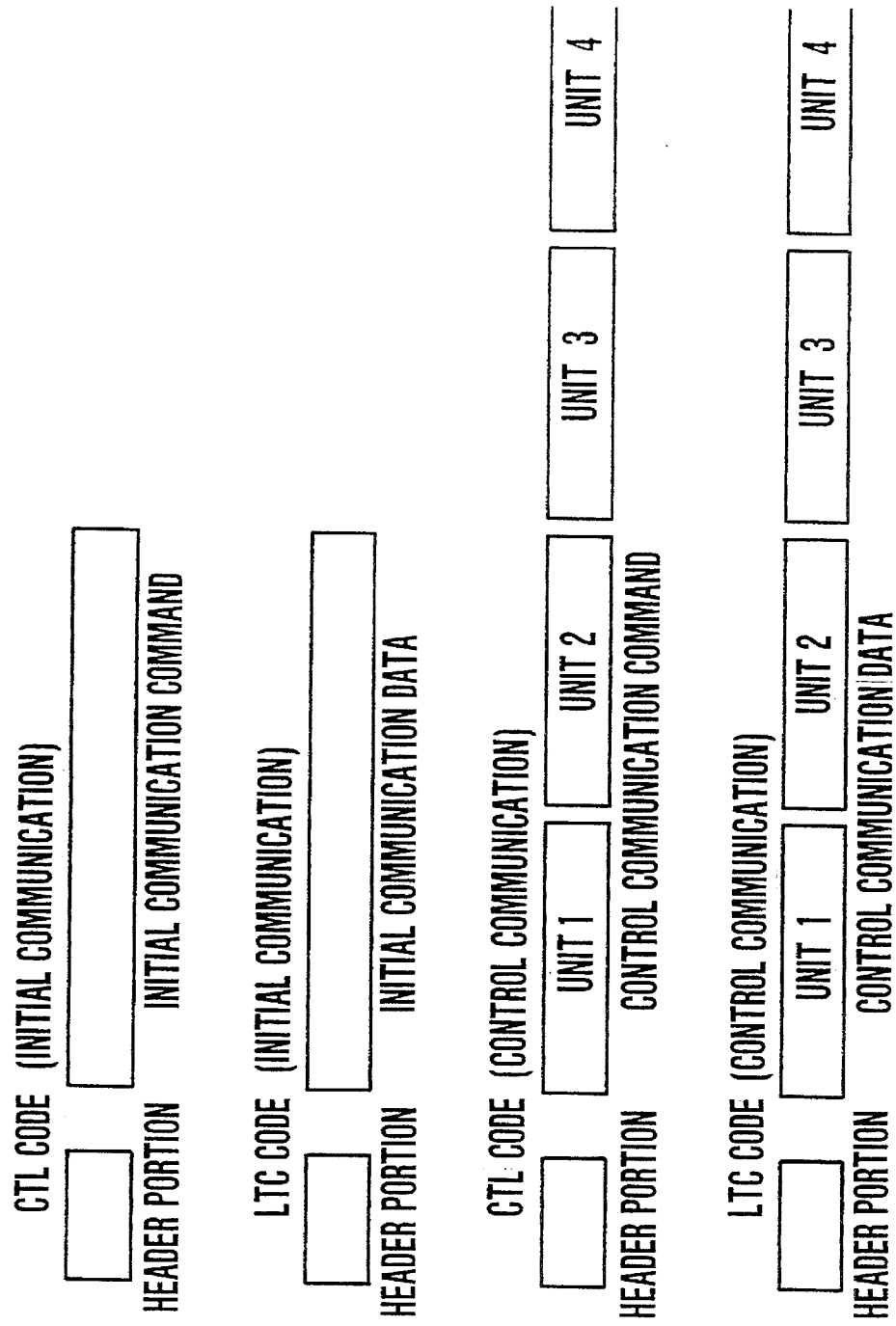

CAMERA-SIDE PROCESSING (CAMERA ASSEMBLY A)

CAMERA-SIDE PROCESSING (CAMERA ASSEMBLY B)

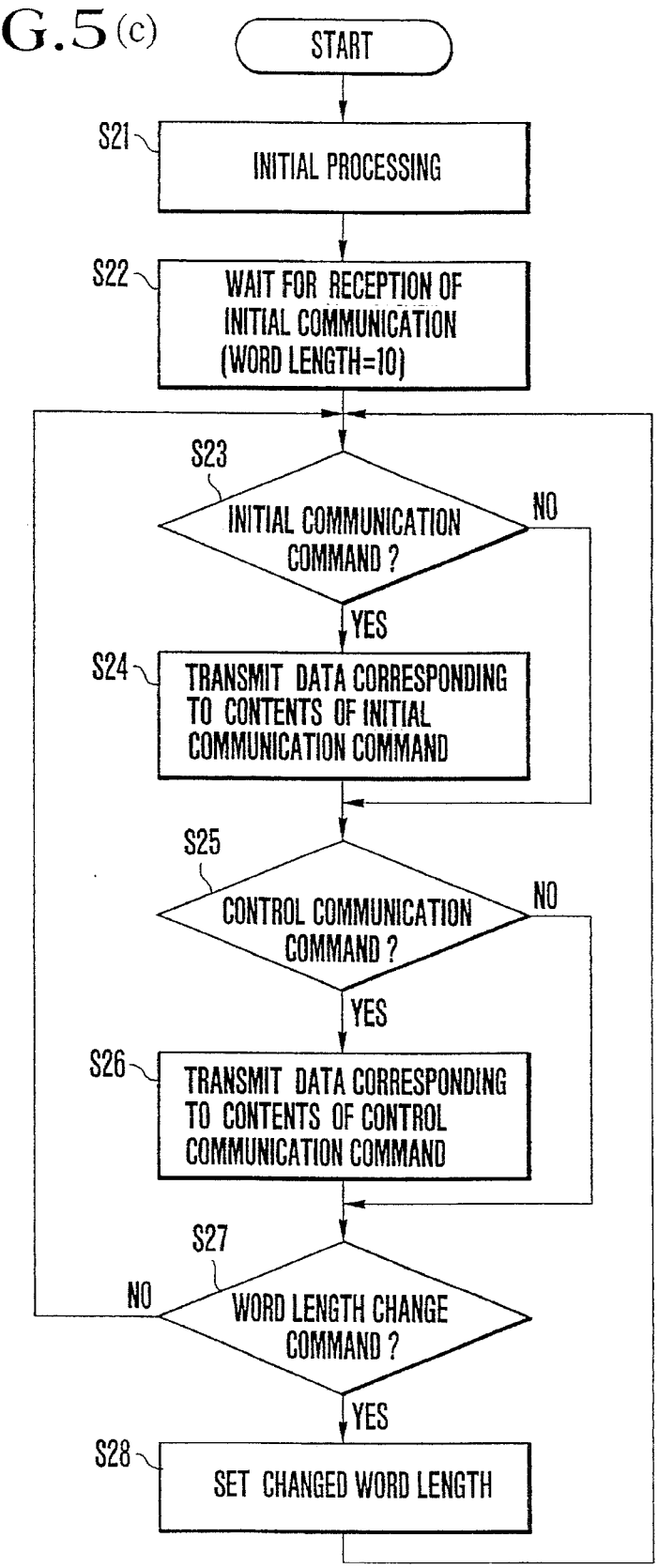

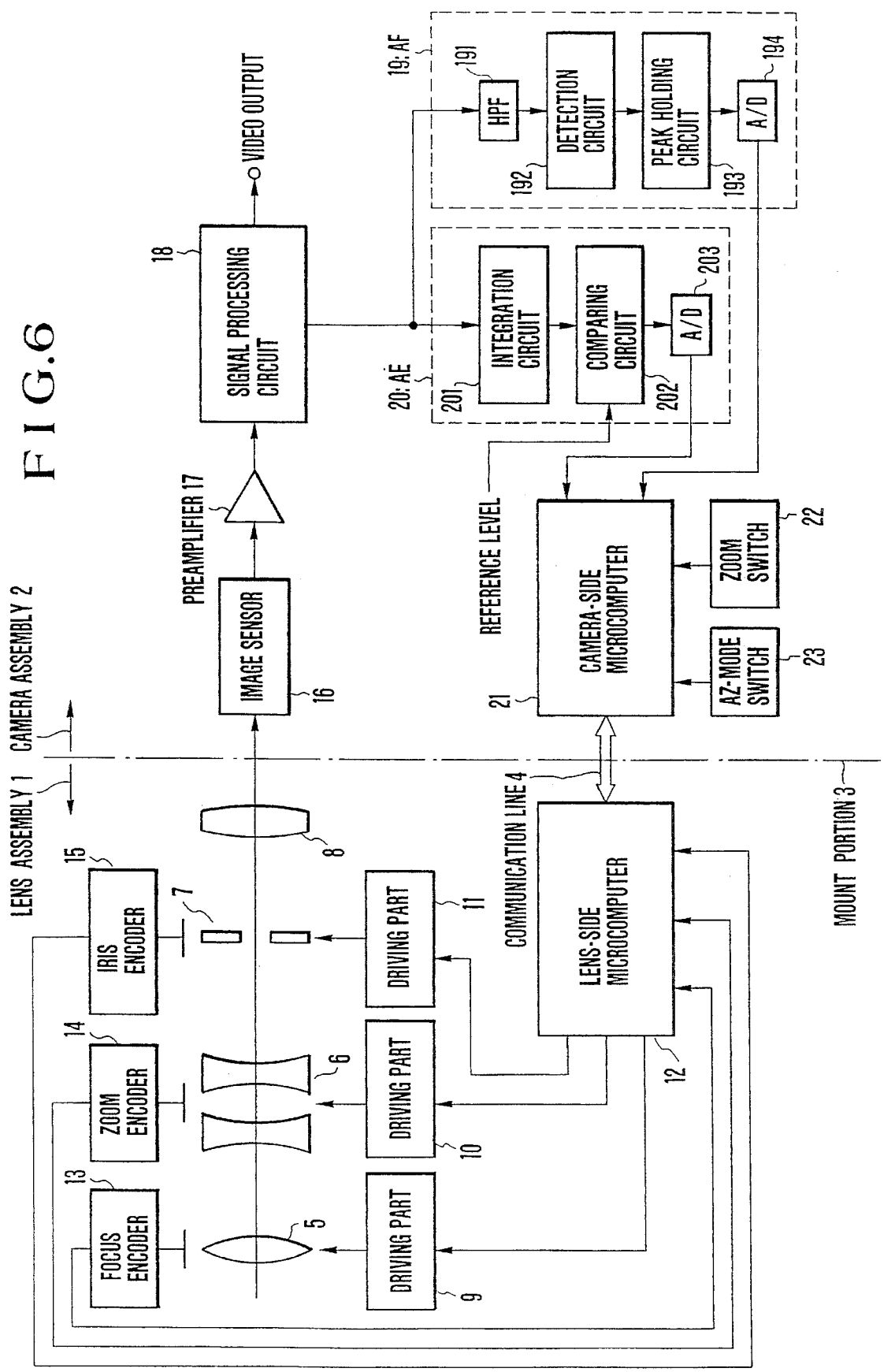

CAMERA-SIDE PROCESSING

F I G. 15(a)
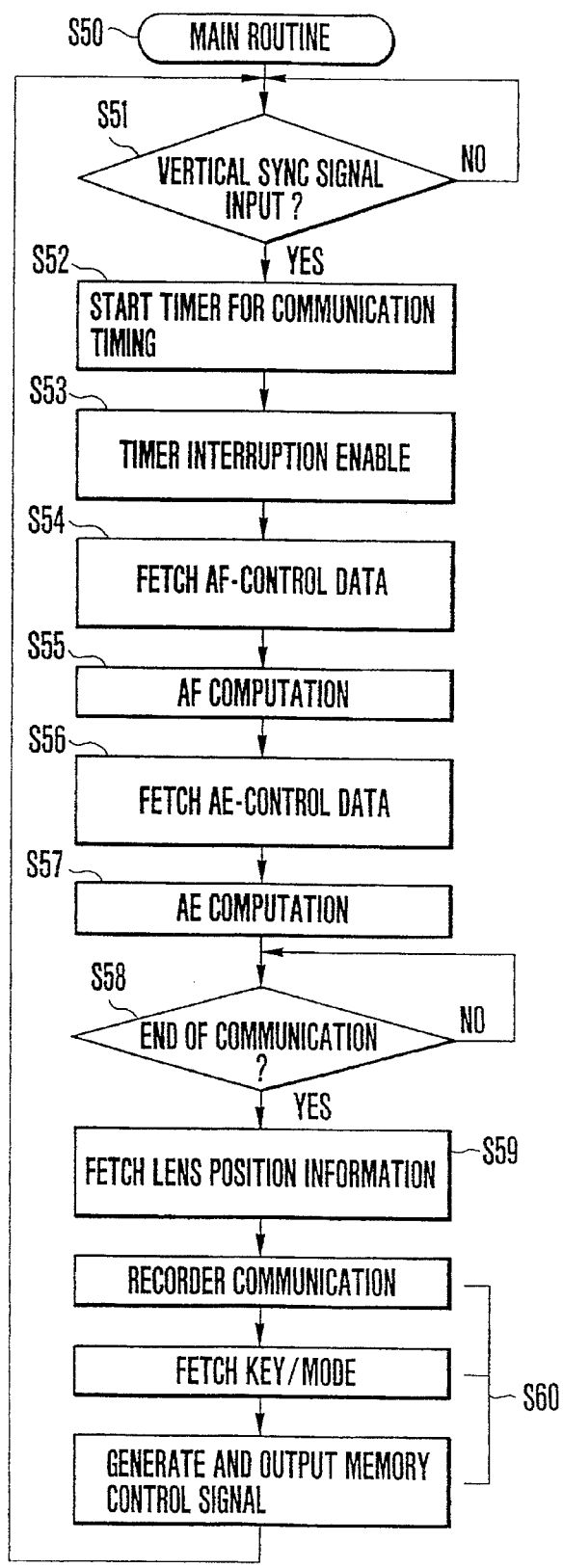
F I G. 15(b)
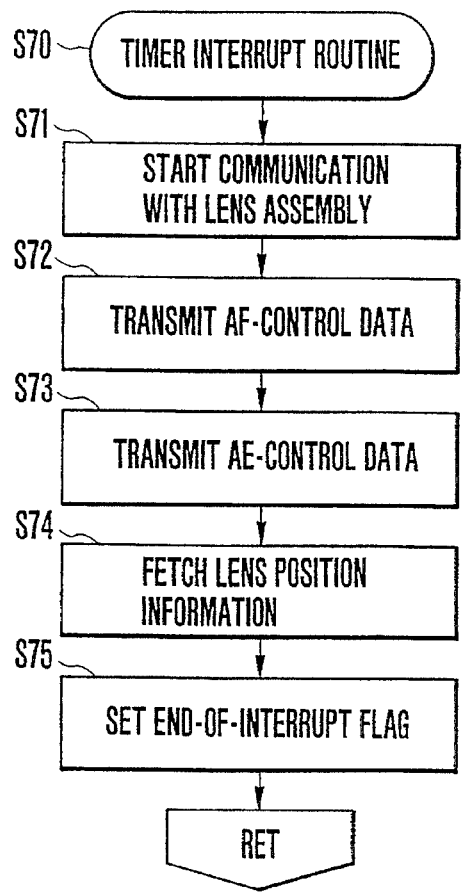

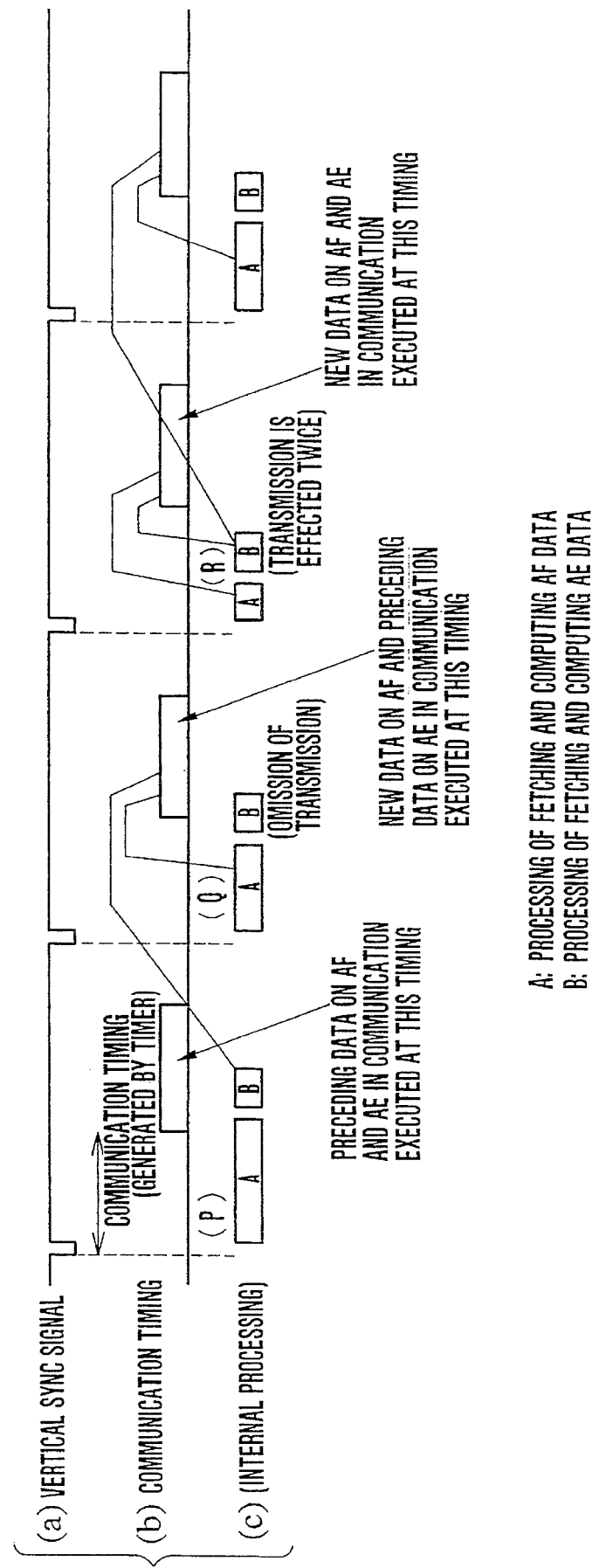

CAMERA SYSTEM

This is a continuation application under 37 CFR 1.62 of prior application Ser. No. 08/191,711, filed Feb. 3, 1994, which is a continuation of Ser. No. 08/067,488, filed May 25, 1993, abandoned, which is a continuation of Ser. No. 970,286, filed Nov. 2, 1992, abandoned, which is a divisional of Ser. No. 711,124 filed Jun. 6, 1991 issued as U.S. Pat. No. 5,151,026, which is a continuation of Ser. No. 587,001, filed Sep. 24, 1990, abandoned.

BACKGROUND OF THE INVENTION

1. Field of the Invention

The Present invention relates to a communication system suitable for use in communication of control information between the camera and lens assemblies of, for example, an interchangeable-lens type camera system.

2. Description of the Related Art

In recent years, imaging systems such as camera systems and video camera systems have been remarkably developing, and various kinds of imaging systems which have a variety of functions and which allow interchangeable lens assemblies to be used with a camera assembly have been available.

In such an imaging system, a camera assembly such as a video camera assembly (hereinafter referred to simply as a "camera assembly") obtains from an interchangeable lens assembly specific information indicative of various characteristics and control information relating to the interchangeable lens assembly. The camera assembly in turn transmits predetermined control information to the lens assembly on the basis of the specific information so as to provide various kinds of control such as auto-focus (AF), auto-exposure (AE) and auto-zoom (AZ).

Transmission of the above-described control information and characteristics information is commonly realized by the communication performed between the camera and lens assemblies.

As is known, such an interchangeable-lens type imaging system is constructed of camera and lens assemblies which functionally differ from each other, and its total function is determined by a combination of the functions of the camera assembly and those of the lens assembly.

FIGS. 1(a) and 1(b) are schematic views showing system arrangements each provided by a combination of camera and lens assemblies in a camera system of the above-described type. A case where either of camera assemblies A and B having different functions is, as shown in FIG. 1(a), combined with either of lens assemblies C and D having different functions will be considered below.

It is assumed, as shown in FIG. 1(b), that the camera assembly A is capable of controlling an AF block A-AF for providing an AF function, an AE block A-AE for providing an AE function, an AZ block A-AZ for providing an AZ function and that the camera assembly B is capable of controlling only an AE block B-AE for providing an AE function.

It is also assumed that the lens assembly C includes an AF block C-AF, an AE block C-AE and an AZ block C-AZ and can selectively perform their functions. Further, it is assumed that the lens assembly D includes an AF block D-AF and an AE block D-AE and can selectively perform their functions.

In a first combination in which the camera assembly A and the lens assembly C are connected to each other by a serial communication line DL, the AF, AE and AZ functions can be performed. In a second combination in which the camera assembly A and the lens assembly D are connected to each other by the serial communication line DL, the AF and AE functions can be performed. If the camera assembly B is applied to either of the first and second combinations, only the AE function can be performed.

To assure reliable compatibility with respect to lens assemblies having different functions, as can be seen from the examples shown in FIGS. 1(a) and 1(b), control information based on a common format and detection information indicative of the driven state of each element needs to be communicated between the camera assembly A or B and the lens assembly C or D over the communication line DL. To achieve such communication, an appropriate common format is needed.

SUMMARY OF THE INVENTION

It is, therefore, an object of the present invention to provide an interchangeable-lens type camera system in which it is possible to smoothly control a lens assembly.

It is another object of the present invention to provide a camera system capable of efficiently controlling each function of a lens assembly by communication with a camera assembly.

It is another object of the present invention to provide a camera system in which control information associated with each unit to be controlled in a lens assembly and detection information indicative of the driven state thereof can be readily independently communicated between camera and lens assemblies irrespective of the number or kinds of units to be controlled, whereby it is possible to completely assure compatibility with respect to various lens assemblies including different numbers of units to be controlled.

To achieve the above objects, in accordance with one aspect of the present invention, there is provided a camera system capable of controlling a plurality of units in a lens assembly on the basis of control information transmitted from a camera assembly. The camera system comprises camera-side control means disposed in the camera assembly for transmitting the control information to the lens assembly, and lens-side control means disposed in the lens assembly for receiving the control information transmitted from the camera assembly and controlling the aforesaid plurality of units to be controlled. Each of the units includes driving means and detecting means for detecting a displacement provided by the driving means. The camera-side control means is arranged to serially transmit the control information on each of the units to the lens-side control means as a block corresponding to each of the units to be controlled, while the lens-side control means is arranged to drive the driving means in each of the units on the basis of the control information and to serially transmit to the camera-side control means information on each of the units, which is outputted from the detecting means, as a block corresponding to each of the units to be controlled.

It is another object of the present invention to provide a camera system in which each function of a lens assembly is controlled from a camera assembly, each function of the lens assembly being realized by a unit which includes a part for providing a desired function, a driving system, and detecting means for detecting the operating state of the part. The camera assembly transmits control information on each of the units to the lens assembly by serial communication, whereby each of the units of the lens assembly can be separately controlled in accordance with the control function of the camera assembly and the function of the lens assembly combined therewith.

It is another object of the present invention to provide a camera system in which control information associated with each unit to be controlled in a lens assembly and detection information indicative of the driven state thereof can be readily independently communicated between camera and lens assemblies irrespective of the number or kinds of units to be controlled, whereby it is possible to completely assure compatibility with respect to various lens assemblies including different numbers of units to be controlled.

It is another object of the present invention to provide an interchangeable-lens type camera system which can reliably controlling an interchangeable lens assembly by smoothly performing an initial communication for initializing the camera system and a control communication for effecting communication of substantial control information.

It is another object of the present invention to provide a camera communication system which makes it possible to reduce the requisite processing time without unnecessarily increasing the number of communication words even in a camera system of the type in which the number of communication words for an initial communication between camera and lens assemblies differ from the number of communication words for a control communication between them.

It is another object of the present invention to provide a communication system in which the number of communication words is variable so that the number of communication words can be increased or decreased as required and which can realize the functions of camera and lens assemblies connected to the communication system by utilizing a minimum communication system and without increasing the cost of a microcomputer or the like even in a case where the number of communication words is changed depending on the kind of communication.

To achieve the above object, in accordance with another aspect of the present invention, there is provided a camera system which controls a function of a lens assembly on the basis of control information serially transmitted from a camera assembly. The camera system is provided with communication means which effects communication of the control information and which is capable of changing the number of communication words associated with the communication, and means for transmitting, if the number of communication words is changed, the changed number of communication words from the camera assembly to the lens assembly.

In accordance with another aspect of the present invention, there is provided a camera system which controls a function of a lens assembly on the basis of control information serially transmitted from a camera assembly, which camera system includes first means for serially transmitting words indicative of the control information, second means for changing the number of words indicative of the control information transmitted from the camera assembly, and third means for transmitting, if the number of words for the control information is changed, the changed number of words to the lens assembly.

In accordance with another aspect of the present invention, there is provided a camera assembly to which a lens assembly can be detachably attached and which comprises communication means for effecting serial communication of the control information required to control a function of the lens assembly, changing means for finding the number of functions to be controlled or the state of the lens assembly and changing the number of communication words for the communication means, and means for transmitting, if the number of communication words is changed, information indicative of the changed number of communication words to the lens assembly.

In accordance with another aspect of the present invention, there is provided a data communication system which comprises communication means for selectively setting, between a master side and a slave side, a first communication mode for finding the state of connection of the system, a function of the slave side, etc. and a second communication mode for controlling the function of the slave side; and means for transmitting to the slave side information on the number of words for a communication mode which is selected if a mode switching operation is performed between the first communication mode and the second communication mode in a case where the number of communication words in the first communication mode differs from the number of communication words in the second communication mode.

In accordance with another aspect of the present invention, there is provided a data communication system suitable for use in a camera system which controls a plurality of functions of a lens assembly on the basis of information on individual communication words serially transmitted from the camera assembly. The data communication system comprises communication means capable of selectively setting an initial communication mode for finding the state of connection between the camera assembly and the lens assembly and a target to be controlled in the lens assembly and a second communication mode for controlling the functions of the lens assembly on the basis of the number of words which differs from the number of words used in the initial communication mode; and means for transmitting to the lens assembly information on the number of words for a communication mode which is selected if a mode switching operation is performed between the first communication mode and the second communication mode.

It is another object of the present invention to provide a camera system in which various kinds of system control are effected by means of synchronous communication performed between a camera assembly and a lens assembly. The camera system is provided with a word length change command indicative of a word length to be used as an operand in the next communication cycle, as one kind of initial/control command to be transmitted from the camera assembly to the lens assembly. The camera system is arranged in such a manner that a communication master side communicates a change in a communication word length to a communication slave side by using the word length change command before the change in the communication word length. Accordingly, it is possible to prevent the occurrence of a synchronization failure on the communication slave side or an increase in the number of unnecessary processes.

It is another object of the present invention to provide a camera system in which by using a word length change command in the control communication provided between camera and lens assemblies, it is possible to achieve smooth communication without causing a malfunction of the system or without the need to consume unnecessary processing time even if the number of communication words, the mode of communication or the like is changed.

It is another object of the present invention to provide a camera system which makes it possible to achieve a system provided with optimum communication word lengths for various combinations having different functions without the need to increase the amount of processing on a camera side or a lens side or without the requirement of excessively high throughputs on the lens side, that is, without the risk of causing an increase in the cost of a lens-side processing unit such as a microcomputer.

It is another object of the present invention to provide an interchangeable lens system which is arranged to perform communication between a camera assembly and a lens assembly. In such an interchangeable lens system, if the lens assembly does not include a control device, communication data transmitted from the camera assembly is directly sent back to the same. In this arrangement, the communication between the camera assembly and the lens assembly can be accomplished to inform the camera assembly that the lens assembly does not include any target to be controlled, without the need to incorporate any microcomputer in the lens assembly. In consequence, it is possible to eliminate the problem that it has been necessary to provide a microcomputer in a lens assembly which does not include any target to be controlled or that a camera assembly continues to transmit data without being able to detect the presence or absence of a target to be controlled in the lens assembly. Accordingly, it is possible to achieve smooth and rapid control.

To achieve the above object, in accordance with another aspect of the present invention, there is provided an interchangeable lens system which comprises a camera assembly; a lens assembly which can be detachably attached to the camera assembly; communication means for providing communication of control information between the camera assembly and the lens assembly; driving means in the lens assembly being controlled from the camera assembly through the communication means; and reply means for sending the control information back to the camera assembly as reply information indicating that there is no target to be controlled, if the lens assembly does not include any driving means corresponding to the control information supplied from the camera assembly to the lens assembly.

In accordance with another aspect of the present invention, there is provided a lens assembly which can be detachably attached to a camera assembly, which comprises reply means for sending control information, supplied from the camera assembly, back to the camera assembly as reply information indicating that there is no driving means, if the lens assembly does not include any driving means corresponding to the control information.

In accordance with another aspect of the present invention, there is provided a camera assembly to which a lens assembly can be detachably attached, the camera assembly comprising communication means for transmitting to the lens assembly control information required to drive driving means in the lens assembly and for receiving reply information sent back from the lens assembly; and control means for omitting control associated with the driving means, if the communication means receives from the lens assembly reply information indicating that the lens assembly includes no driving means corresponding to the control information.

In accordance with another aspect of the present invention, there is provided a control system comprising a master-side unit; a slave-side unit which can be detachably attached to the master-side unit; communication means for providing communication of control information between the master-side unit and the slave-side unit; driving means in the slave-side unit being controlled from the master-side unit through the communication means; and reply means for sending communication data, supplied from the master-side unit, directly back to the master-side unit as reply information indicating that there is no target to be controlled, if the slave-side unit does not include any target to be controlled corresponding to the control information supplied from the master-side unit.

It is another object of the present invention to provide a lens driving apparatus in which, even if a variation occurs in the time required to compute each kind of control information such as AE control information, the correspondence between computational information and information to be transmitted can be kept constant with respect to a lens assembly to be controlled. Accordingly, it is possible to achieve highly reliable control which is free from malfunction such as the transmission of partially omitted information or double transmission of the same information and which does not confuse a control operation.

To achieve the above object, in accordance with another aspect of the present invention, there is provided a lens driving apparatus which comprises driving means for driving an optical system; photoelectric conversion means for converting into an electrical signal an image signal formed on its image-forming surface by the optical system; computation means for performing computations on the control information required to control the optical system; communication means for communicating information indicative of the result of the computations performed by the computation means to the driving means at a predetermined communication timing; and control means for controlling the communication means so that the communication means transmits to the driving means the information indicative of the result of the computations performed by the computation means in synchronization with a communication timing which follows the time of completion of the computations.

In accordance with another aspect of the present invention, there is provided a lens driving apparatus which comprises driving means for driving an optical system; photoelectric conversion means for converting into an electrical signal an image signal formed on its image-forming surface by the optical system; memory means for storing at least part of the output signal of the photoelectric conversion means; computation means for performing computations on the control information required to control the optical system, by using a digital signal stored in the memory means; communication means for communicating information indicative of a result of the computations performed by the computation means to the driving means in synchronization with a vertical synchronizing signal; and control means for controlling the communication means so that the communication means transmits to the driving means the information indicative of the result of the computations performed by the computation means in synchronization with a vertical synchronizing signal which follows the time of completion of the computations.

The above and other objects, features and advantages of the present invention will become apparent from the following detailed description of embodiments of the present invention, taken in conjunction with the accompanying drawings.

BRIEF DESCRIPTION OF THE DRAWINGS

FIG. 2 is a timing chart of a serial communication;

FIG. 3 is a schematic view showing the time relationship between a CTL code and an LTC code;

FIG. 4 is a schematic view showing the configuration of a word in each of initial and control communications;

FIGS. 5(a), 5(b) and 5(c) are flowcharts showing methods of processing associated with camera-side communication and lens-side communication;

FIG. 6 is a block diagram which serves to illustrate various functions of a camera assembly and those of a lens assembly;

FIGS. 15(a) and 15(b) are flowcharts showing the normal processing executed by a camera microcomputer;

FIG. 16 is a timing chart showing the timings at which the interrupt shown in the flowcharts occurs.

DETAILED DESCRIPTION OF THE PREFERRED EMBODIMENTS

Preferred embodiments of the present invention will be described below with reference to the accompanying drawings.

First of all, a communication system to which a first embodiment of the present invention is applied will be described in detail with reference to FIGS. 1(a) through 6.

Figure 1A:
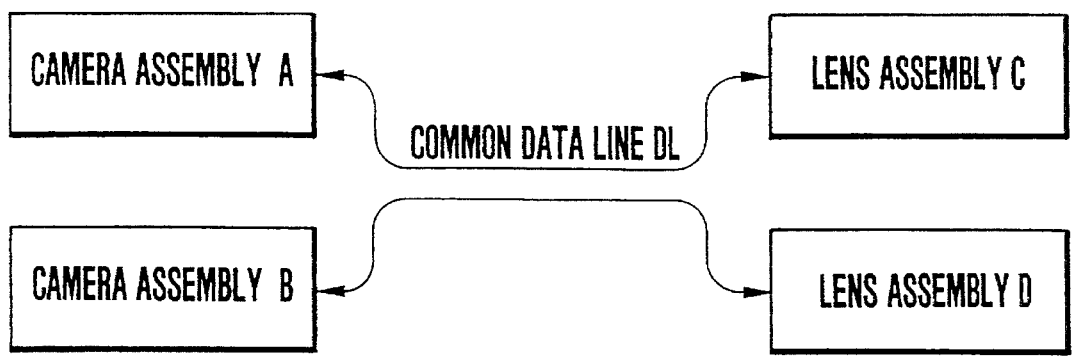
FIGS. 1(a) and 1(b) are connection diagrams showing a camera system to which a first embodiment of the present invention is applied.
Figure 1B:
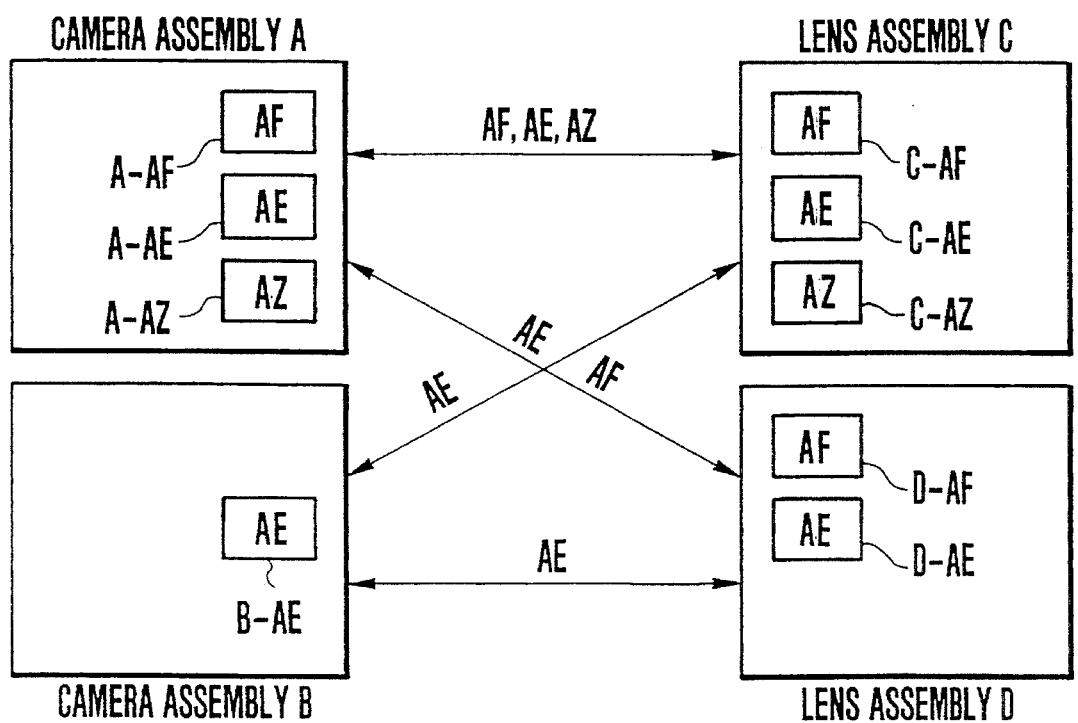
Figure 5A:
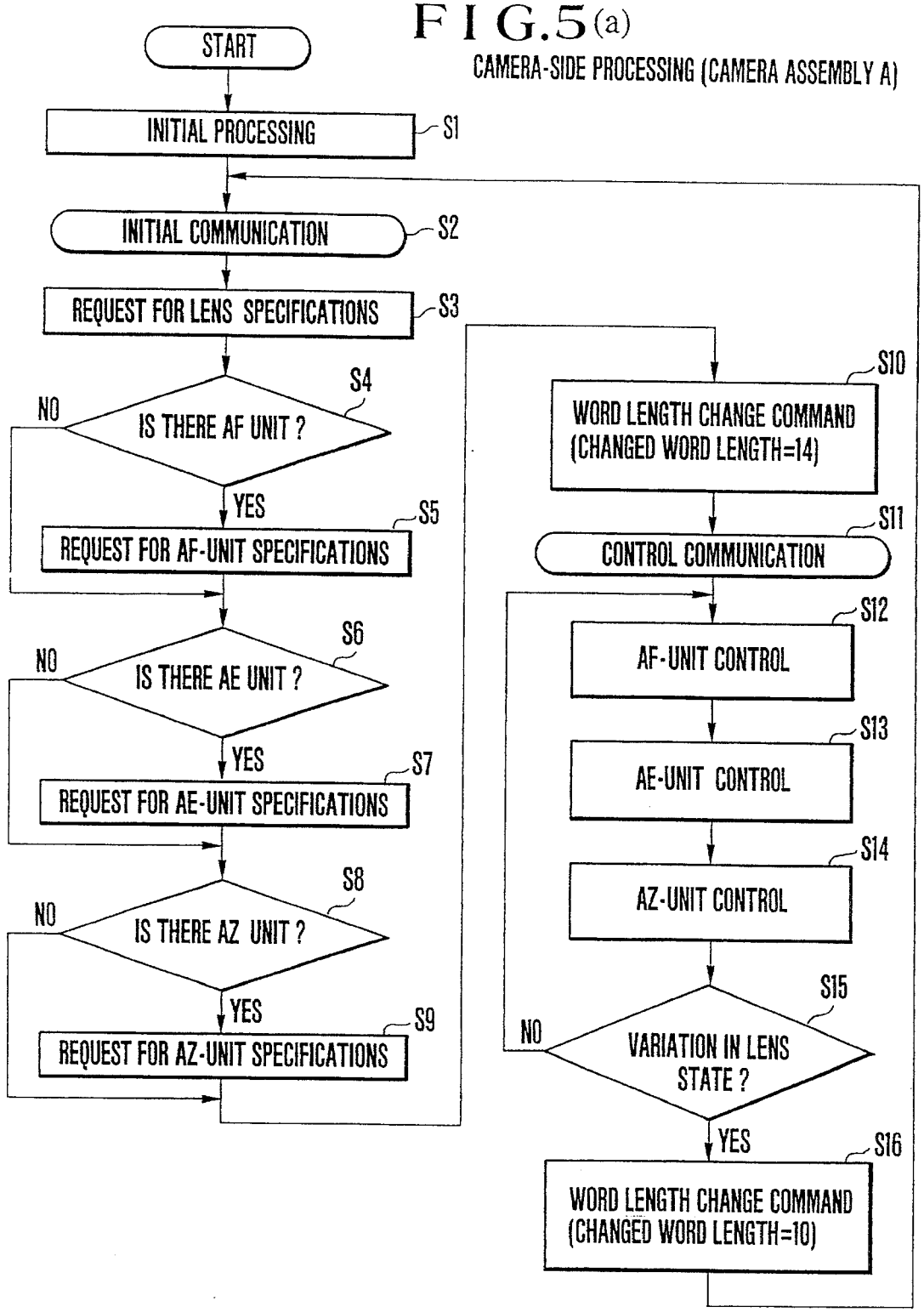
Figure 5B:
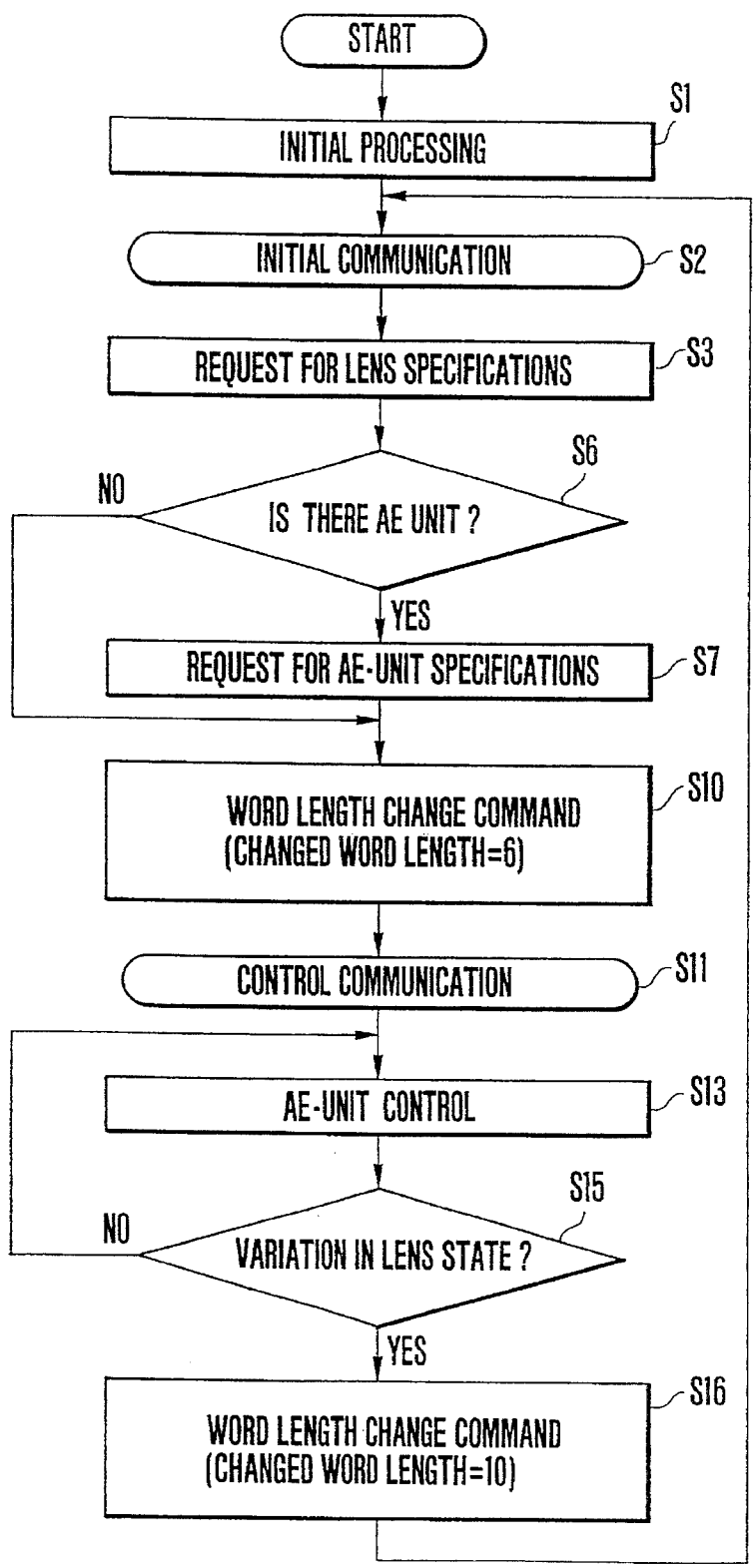

FIGS. 1(a) and 1(b) are schematic views showing system arrangements each provided by a combination of camera and lens assemblies in a camera system of the above-described type. FIG. 2 is a timing chart which serves to illustrate data communication between the camera assembly and the lens assembly. FIG. 3 is a view showing the time relationship between data transmitted from the camera assembly to the lens assembly and reply data sent back from the lens assembly to the camera assembly. FIG. 4 is a view showing the internal code arrangement of each communication data. FIGS. 5(a) and 5(b) are flowcharts showing the control operation of the camera assembly, and FIG. 5(c) is a flowchart showing the control operation of the lens assembly. FIG. 6 is a block diagram showing the respective functions of the camera assembly and the lens assembly.

The arrangements of the camera assembly and the lens assembly will be described below with reference to FIG. 6.

Referring to FIG. 6, a lens assembly 1 and a camera assembly 2 are detachably connected to each other by a mount portion 3. When both assemblies are connected to each other, a communication line 4 is formed between the lens assembly 1 and the camera assembly 2 through an electrical contact means disposed on the mount portion 3, the communication line 4 constituting the previously-described communication line DL used for communication of various kinds of information such as initializing information and control information.

The lens assembly 1 comprises one or more units each of which includes the following three elements: a controlled member for realizing a certain function, driving means (including a driving part and associated driving circuitry) for driving the controlled member, and detecting means for detecting the displacement of the controlled member occurring when the driving means drives the controlled member.

One of the units included in the lens assembly 1 is a focusing unit which comprises, for example, a focusing lens 5 for adjustment of focus, a focus driving part 9 for driving the focusing lens 5, and a focus encoder 13 for detecting the operating state of the focusing lens 5.

Another unit is a zooming unit which comprises, for example, a lens group including a relay lens 8 and a zoom lens arrangement 6 arranged to effect zooming by varying its magnification, a zoom driving part 10 for driving the lens group, and a zoom encoder 14 for detecting the operating state of the lens group.

Yet another unit is an iris unit which comprises, for example, an iris mechanism 7 disposed midway along the optical path of the lens group for adjusting the quantity of light transmitted through the lens group, an iris-mechanism driving part-11 for driving the iris mechanism 7, and an iris encoder 15 for detecting the operating state of the iris encoder 7.

The driving parts 9, 10 and 11 of the respective units are driven and controlled on the basis of control information supplied from the camera assembly 2 over the communication line 4, by a control microcomputer 12 for providing global control over the lens assembly. The operating states of the individual driving parts 9, 10 and 11 of the focusing unit, the zooming unit and the iris unit are detected by the focus encoder 13, the zoom encoder 14 and the iris encoder 15, respectively. The results detected by these encoders 13, 14 and 15 are supplied to the control microcomputer 12, where they are subjected to predetermined processing as required. The signal thus obtained is transmitted to the camera assembly 2 over the communication line 4.

The camera assembly 2 includes the following major elements: an image sensor 16, such as a charge-coupled device, for photoelectrically converting the image of an subject formed by the lens assembly 1 connected to the camera assembly 2 into a video signal; a preamplifier 17 for amplifying the video signal output from the image sensor 16 up to a predetermined level; a signal processing circuit 18 arranged to apply predetermined processing, such as gamma correction, .blanking and the multiplexing of a synchronizing signal, to the signal output from the preamplifier 17, thereby converting the signal into a standardized television signal; an AF circuit 19 for detecting the state of focus on the basis of the high-frequency component of a luminance signal in the video signal; an AE circuit 20 arranged to compare the average value of the luminance-signal level of the video signal with a predetermined reference level and output a signal for controlling an aperture value so as to keep the luminance-signal level equal to the reference level; a control microcomputer 21 for providing global control over all the functions of the camera assembly 2; a zoom switch 22 arranged to generate a command for manipulating the zoom lens arrangement 6; and an AZ-mode setting switch 23.

A focus-state detection signal which is outputted from the AF circuit 19, an iris-state detection signal which is outputted from the AE circuit 20, and operation signals which are respectively outputted from the zoom switch 22 and the AZ-mode setting switch 23 are supplied to the microcomputer 21. The microcomputer 21 then performs predetermined operations by making reference to information indicative of the various operating states transmitted from the lens assembly 1, thereby converting the supplied signals into a format suitable for transmission to the lens assembly 1. The signal thus converted is transmitted to the lens assembly 1 over the communication line 4 for the purpose of controlling the lens assembly 1.

The functions of major elements included in the lens assembly 1 and the camera assembly 2 will be described in brief hereinbelow.

The AF circuit 19 functions as follows. A high-pass filter 191 extracts the high-frequency component of the luminance signal of a video signal, which high-frequency component varies according to the state of focus, and a detection circuit 192 detects the extracted high-frequency component and converts it into a DC level. A peak holding circuit 193 detects the peak value of the DC level at predetermined intervals and the output from the peak holding circuit 193 is converted into a digital signal by the A/D conversion circuit 194. The digital signal is supplied to the microcomputer 21. The microcomputer 21 detects the peak value of the high-frequency component at predetermined intervals, then calculates control information for driving the focusing lens 5 in a direction in which the peak value reaches its maximum, while taking account of the depth of field by making reference to aperture information supplied from the lens assembly 1, and then outputs the control information to the lens assembly 1.

An AE circuit 20 functions as follows. The luminance-signal component obtained by separating the video signal into luminance and chrominance signals in the signal processing circuit 18 is supplied to an integration circuit 201, where information on the quantity of light is obtained by integrating the luminance-signal component. A comparison circuit 202 compares the quantity of light with a predetermined reference level and supplies the difference therebetween to an A/D conversion circuit 203. The A/D conversion circuit 203 converts the difference information into a digital signal and supplies it to the microcomputer 21. The microcomputer 21 generates a control signal for driving the iris mechanism 7 in order to cause the luminance-signal level to coincide with the reference level.

In the lens assembly 1, the iris driving part 11 is driven on the basis of the control signal. Thus, the quantity of light transmitted to the camera assembly 2 changes so that a control loop is formed to provide an optimum aperture value.

An AZ mode is selected by actuating the AZ-mode setting switch 23 and serves to compensate for the variation of a subject distance by varying the magnification of the zoom lens arrangement 6, thereby keeping a field angle approximately constant. If the subject distance varies with an AF operation or the like, the microcomputer 21 makes a decision as to the variation of the subject distance on the basis of zoom encoder information or focal-length information supplied from the lens assembly 1 and focus-encoder information or subject-distance information, and calculates the magnification required to compensate for the variation in the field angle due to the variation of the subject distance, that is to say, zoom-lens control information. The microcomputer 21 transmits the zoom-lens control information to the lens assembly 1. In the lens assembly 1, the zoom lens arrangement 6 is controlled and driven on the basis of the zoom-lens control information so as to keep the field angle of the subject approximately constant with respect to that of a viewing screen.

The functions of the major elements of the lens assembly 1 and the camera assembly 2 are as described above. Variations of a system configuration derived from various kinds of combinations of lens assemblies and camera assemblies will be explained below in sequence.

Each kind of data communication executed in the above-described communication system includes an initial communication mode for initializing the system prior to the transmission of control data and a control communication mode for transmitting substantial control data. Transmission of the required information is performed while switching these communication modes.

The operation of switching the communication modes is, for example, performed at the timing when a camera assembly identifies the kind and function of a lens assembly during initial communication and proceeds to substantial drive control or at the timing when the camera assembly again needs the initial data on the lens assembly for a certain reason. The case where the camera assembly again needs the initial data on the lens assembly is, for example, when a lens assembly is exchanged with another during operation.

If X represents the number of words for initial communication, the number of initial communication words, X, is as follows:

$$X=Wh+Wi$$

where Wh is the number of words in a header part and Wi is the number of words used for a substantial initial communication command.

The number of words for control communication, Y, is as follows:

$$Y=Wh+(n \times Wc)$$

where n represents the number of units corresponding to, for example, AF, AE and AZ functions, controllable (required to control) by the functions achieved by a camera assembly and a lens assembly connected thereto and Wc represents the number of control words for one unit.

The relationship between the magnitudes of X and Y—the numbers of communication words—is not primarily determined. If the number of units controllable by the system is small, X>Y is obtained, while if such a number is large, X<Y is obtained. If a medium number of units are controllable, X=Y is obtained.

Accordingly, at the time instant when the kind of communication changes from initial communication to control communication or from control communication to initial communication, the number of communication words required also changes.

In general, in a synchronous communication system, it is possible to always grasp the number of communication words on the communication-master side, but it is impossible to always grasp the number of communication words on the communication-slave side. For this reason, in an ordinary synchronous communication system, communication is performed with the number of communication words kept constant irrespective of the presence or absence of data in order to avoid the confusion of the system.

However, in the above-described system, if communication is performed with the number of communication words kept constant, the maximum value for the system must be set as the number of communication words.

Referring back to FIG. 1(b), in the above-described case, the combination of a camera assembly A and a lens assembly C can work successfully. However, for the combination of a camera assembly B and a lens assembly D, a communication word which is not directly related to control must be transmitted, resulting in an increase in the amount of unnecessary communication. It follows that unnecessary communication occupies a major part of communication processing and a time period to be allocated for the communication processing is consumed by the unnecessary communication. For this reason, a microcomputer having a capacity exceeding the originally required capacity must be incorporated, thus leading to an increase in cost.

If the number of communication words for a particular communication is to be minimized, for example, a header part of a corresponding communication code may also be used to transmit the number of words for the communication.

In this case, on the lens side, it is necessary, however, to decode the communication code at the interval of a word space in a synchronous communication and select control according to the number of words obtained by decoding. A high throughput is still required on the lens side and a processing system having excessive performance is required, thus leading to an increase in cost.

To solve the above-described problem, according to the present invention, there is provided a communication system in which the number of communication words is rendered variable so that the number of communication words is increased, if necessary, but, if unnecessary, the number of communication words is decreased, whereby the functions of camera and lens assemblies which are connected to the system can be realized by the minimum scale of communication system and without the need to increase the cost of a microcomputer or the like even in a case where the number of communication words varies depending on the kind of communication.

In the above-described arrangement, various kinds of system control are effected by means of synchronous communication performed between a camera assembly and a lens assembly. A word length change command indicative of a word length to be used as an operand in the next communication cycle is prepared as one kind of initial/control command to be transmitted from the camera assembly to the lens assembly. A communication master side communicates a change in a communication word length to a communication slave side by using the word length change command before the change in the communication word length. Accordingly, it is possible to prevent the occurrence of a synchronization failure on the communication slave side or an increase in the number of unnecessary processes.

A system obtained when the camera assembly A and the lens assembly C are connected to each other will be discussed below with reference to FIGS. 1(a) and 1(b).

In such a system, the camera assembly A generates a command for inquiring the functions of the lens assembly C, that is, the kind of unit—whether AF, AE or AZ. The command is hereinafter referred to as a "lens-specifications request command".

In FIG. 3, DCTL (Data Camera To Lens) represents a data block to be transmitted from a camera assembly to a lens assembly, while DLTC (Data Lens to Camera) represents a data block to be sent back from a lens assembly to a camera assembly.

The communication between the camera and lens assemblies is performed in synchronization with a vertical synchronizing frequency V. In the first embodiment, such a communication is performed in synchronization with each vertical synchronizing frequency V. More specifically, when a transmission from the camera assembly to the lens assembly is performed at the timing of V, reply data is sent at the timing of the next V.

It is assumed here that the above-described lens-specifications request command corresponds to a data block DCTL-1 as viewed in FIG. 3.

At this time, the lens assembly C receives the data block DCTL-1, and sends a data block DLTC-2 back to the camera assembly A at the timing of the next V, the data block DLTC-2 representing what unit or function the lens assembly C has in itself.

The camera assembly A includes an AF unit A-AF, an AE unit A-AE and an AZ unit A-AZ, while the lens assembly C includes an AF unit C-AF, an AE unit C-AE and an AZ unit C-AZ.

As can be seen from the foregoing, the thus-combined system is capable of realizing AF control, AE control and AZ control.

The camera assembly A cannot provide substantial control if it cannot acquire information on the operating range of each unit of the lens assembly C or what control method is possible. Accordingly, if the lens assembly C has answered that it has a unit corresponding to the lens-specifications request command, it is necessary to acquire information on the specifications of the unit.

The camera assembly A then inquires the specifications of each unit of the lens assembly C. A command for this inquiry is hereinafter referred to as a "unit-specifications request command".

Referring to FIG. 3, a unit-specifications request command for the AF unit corresponds to a data block DCTL-3, while a unit-specifications request command for the AE unit corresponds to a data block DCTL-4. Data from each unit of the lens assembly C is sent back to the camera assembly A at one communication timing as described above. The contents of the unit-specifications request command differ for each unit. For example, the AF unit includes the maximum and minimum values of a focusing distance, the maximum and minimum values of the speed of a focusing motor, and the like. The AE unit includes, for example, an f-number, and the AZ unit includes, for example, a telephoto-end focal distance and a wide-angle-end focal distance.

The above-described lens-specifications request command and unit-specifications request command correspond to what is called initial communication for fetching information which is needed prior to a substantial control operation, and the number of communication words for each of the request commands is predetermined.

In other words, each command for use in initial communication is employed in a common manner irrespective of the way in which camera and lens assemblies are combined with each other.

If the predetermined number of communication words, $W_i$, is equal to 8 and the number of words, $W_h$, in the header part is equal to 2, the number of words, $X$, used in the initial communication is as follows:

$$X = 2 + 8 = 10$$

The camera assembly then generates a specific control command to the lens assembly to satisfy its function. Such a command is generated for each unit to be controlled.

It is assumed here that a control command for one unit consists of, for example, four words. For the combination of the camera assembly A and the lens assembly C, the number of units to be controlled is three—the AF unit, the AE unit and the AZ unit—and hence, n=3. Therefore, the number of words, X, during control communication becomes:

$$X=2+3\times 4=14$$

where the number of words, Wh, in the header part is two.

In the case of the above-described combination, when the initial communication (10 words) proceeds to the control communication (14 words), the number of words increases.

If a similar operation is conducted with the combination of the camera assembly B and the lens assembly C, it follows that the number of words for initial communication is ten, as in the case of the combination of the camera assembly A and the lens assembly C. However, since control communication is applied to the AE unit only, the number of words for the control communication becomes six. Accordingly, when the initial communication proceeds to the control communication, the number of words decreases.

FIG. 2 is a timing chart showing the communication between the camera and lens assemblies.

For the convenience of explanation, it is assumed that the communication of data between the camera and lens assemblies is accomplished by a synchronous serial communication.

The communication between the camera and lens assemblies is performed by alternately switching between the camera-to-lens data communication line DCTL and the lens-to-camera data communication line DLTC. SCLK (serial clock) denotes a clock signal for serial synchronization, and CS (chip select) is a chip select signal which serves as a trigger signal for instructing a lens assembly positioned on the slave side in the serial communication to start communication.

As described above, the repetition frequency of communication is set to the period of the vertical synchronizing signal V of a video signal by taking account of AF processing and AE processing using the video signal, executed in a video camera or the like.

The serial communication utilizes an 8-bit word and a fixed word space WS so that it can be implemented on an inexpensive microcomputer.

In FIG. 2, DCTL and DLTC each represent a positive logic expression, while CS and SCLK each represent a negative logic expression.

As can be seen from FIG. 2, when the chip select signal CS is outputted in synchronization with the vertical synchronizing signal V after a predetermined time has passed, the data communication between the camera and lens assemblies is repeatedly performed for the predetermined number of communication words by alternately switching between the data communication lines DCTL and DLTC in synchronization with the serial clock signal SCLK.

Referring to FIG. 2 as well as FIG. 3, the relationship between the data DCTL and the data DLTC will be further described. If the lens assembly is to transfer a reply to a command supplied from the camera assembly to the lens assembly in the same communication cycle, it is necessary to decode the meaning of the data DCTL within the word space WS and set data corresponding to the obtained contents as the data DLTC so that the data is sent back to the camera assembly.

To achieve the above-described process, the microcomputer needs to have a considerably high throughput. A processing method which can be implemented in the lens assembly is seriously restricted by the limitation of its throughput.

For this reason, as shown in FIG. 3, a method is adopted which repeatedly performs alternating communication in such a way that if the data DCTL is selected, the lens assembly transmits its answer to the camera assembly as the data DLTC at the next communication timing. For example, the answer of the lens assembly to the data DCTL-1 corresponds to the data DLTC-2, while the answer of the lens assembly to the data DCTL-2 corresponds to the data DLTC-3.

The data DLTC-1 existing when the first data DCTL is transmitted represents only a serial communication format and has no substantial meaning since request for data acquisition has not yet been transmitted from the camera assembly.

Referring to FIGS. 1(a) and 1(b), the function of the camera assembly A which can operate as a global system depends upon whether the lens assembly C or the lens assembly D is connected to the common data line DL.

For this reason, if the camera assembly A is connected to the common data line DL, the camera assembly A requests for specific information on a lens assembly which is connected to the opposite end of the common data line DL in order to determine what function the lens assembly has. After the specific information on the lens assembly has been clarified, that is, after it has been determined what kind of control is applicable to the lens assembly, control which matches the lens assembly is performed.

Communication for requesting specific information on a lens assembly is termed "initial communication", while communication for controlling the function of the lens assembly is termed "control communication".

As described above, the initial communication is a communication in which a camera assembly inquires of a lens assembly, through the data DCTL, what kind of function the lens assembly can perform, how the function can be controlled by the camera assembly, and how is the operating range of the function and in which the lens assembly transmits an answer to the camera assembly through the data DLTC. Since the initial communication is used to determine what kind of function the lens assembly has, the number of words required for communication is primarily determined as a fixed number of words irrespective of the type of camera or lens assembly.

The control communication is a communication in which a camera assembly outputs to a lens assembly through the data DLTC an instruction to perform specific control operations for the various functions of the lens assembly which has been clarified through the initial communication. In the control communication, since the contents and kind to be controlled differ for each of the functions of the lens assembly, it is impossible to always primarily determine the number of words (a variable number of words).

The contents and method of the control communication will be described below in brief.

The representative functions of a so-called camera system in which a camera assembly is combined with a lens assembly are an AF function, an AE function and an AZ function. In these functions, the camera assembly generates a control code on the basis of certain information and the lens assembly activates a corresponding function on the basis of the control code. If the state of the lens assembly varies, the varied contents are transmitted to the camera assembly.

The camera assembly also refers to the information supplied from the lens assembly and, if necessary, again generates a control code to the lens assembly.

A specific example of the above-described control will be described below with reference to the AE control.

Although described above, the AE control is performed as follows. The camera assembly converts light transmitted through a lens assembly (including an iris mechanism) into an electrical signal (video signal) by means of an image sensor (CCD or the like). The thus-converted video signal is separated into luminance and chrominance signal components by a low-pass filter or the like. Information on the quantity of light obtained by integrating the luminance signal component is compared with a predetermined reference level, and a control signal for driving the iris mechanism is generated so as to make the quantity of light to coincide with the reference level. The lens assembly drives its iris mechanism on the basis of the control signal to vary the quantity of light to be transmitted to the camera assembly, whereby a control loop is formed so as to finally obtain an optimum aperture value.

Although the above example refers to an example of the AE control, in the case of the AF control or the AZ control as well, the camera assembly outputs control (drive) data to the lens assembly on the basis of the optical and electrical information obtained through the lens assembly, and the lens assembly drives a certain driving system, whereby information to be transmitted to the camera assembly varies and a loop is formed so as to finally provide optimum control.

Each functional portion present in each lens assembly, which constitutes part of the above-described control system, is hereinafter referred to as "unit". The unit is assumed to include a certain driving system for varying the amount of control of the function of the unit and a certain state-detecting encoder which is required to transmit the amount of variation to the camera assembly.

Referring back to FIGS. 1(a) and 1(b), the camera assembly A has the function of controlling the AF, AE and AZ units, while the camera assembly B is capable of controlling the AE unit only. The lens assembly C has the AF unit, the AE unit and the AZ unit, while the lens assembly D has the AF unit and the AE unit.

FIG. 4 shows the code arrangement of initial communication and that of control communication. CTL (Camera To Lens) represents a data block to be transmitted from camera assembly to lens assembly, while LTC (Lens to Camera) represents a data block to be sent back from lens assembly to camera assembly.

Each code consists of a header part and a command part (in the case of CTL) or a data part (in the case of LTC). The header part indicates the kind of content of a command or data, for example, what kind of communication is being performed—whether initial communication, control communication or other communication—and whether the direction of communication corresponds to LTC or CTL.

The word length in the header part of a CTL code and that in the header part of an LTC code are always constant throughout initial communication and control communication.

The command/data part is, as described above, a portion which indicates substantial control provided by a camera assembly and the state of driving transmitted from a lens assembly and which is divided into subportions each for one unit.

Since a camera assembly positioned on the master side of serial communication is capable of managing the number of communication words for itself, there is no problem. However, if the number of words abruptly varies, especially if the number of words decreases, a lens assembly positioned on the slave side of the serial communication becomes unable to complete its serial processing eternally since the lens assembly handles the communication by using the previous number of words. In the worst case, the camera assembly will erroneously fetch data which will be transmitted at the next communication timing.

According to the first embodiment, the above-described problem is solved in such a way that when the number of words for serial communication varies, a word length change command is generated and the thus-changed word length is set as the operand of the command.

This command is, of course, transmitted by using the previous word length which has not yet been changed. If the camera assembly itself needs to change the kind of command, the camera assembly utilizes the word length change command. If the command is supplied from the camera assembly to the lens assembly, the lens assembly changes the number of words for serial communication and waits for the next communication.

FIGS. 5(a), 5(b) and 5(c) are flowcharts showing a portion related to the first embodiment, in processing for providing communication between the camera assembly and the lens assembly. FIG. 5(a) shows the processing executed in the camera assembly A, FIG. 5(b) shows the processing executed in the camera assembly B, and FIG. 5(c) shows the processing executed in the lens assemblies C and D.

Referring to FIG. 5(a), if the camera assembly A starts its control operation, it performs predetermined initial processing (Step S1). The contents of the initial processing are, for example, various kinds of control, the initialization of registers for use in arithmetic operations and the setting of the speed of serial communication. After the initial processing, an initial communication mode is started (Step S2). It is then determined what kind of lens assembly is currently connected to the camera assembly, by using the lens-specifications request command (Step S3). Thus, it is determined what kind of unit the connected lens assembly includes. Thereafter, the specific .contents of each unit present in the lens assembly are obtained by the unit-specification request command.

After the lens-specifications request command has been executed, the presence or absence of an AF unit is confirmed on the basis of the result of the execution of the request command (Step S4). If the AF unit is present, the specifications of the unit are confirmed (Step S5). If another unit such as the AE unit or the AZ unit is present, the specifications of the unit which is present are fetched from the lens assembly (Steps S6–S9).

Subsequently, specific control is started, but if the camera assembly A and the lens assembly C are combined with each other, the number of communication words is fourteen, as described above. Accordingly, the word length change command as well as the operand "changed word length= 14" (Step S10) is set and transmitted to the lens assembly (Step S11).

Then, the AF control, the AE control and the AZ control are sequentially performed (Steps S12, S13 and S14).

The AF control, the AE control and the AZ control are repeatedly performed by making reference to data sent back from the lens assembly. If a certain change occurs in the camera assembly or the lens assembly during a control operation and initial information on the lens assembly is again required, the process returns to Step S2, where the word length change command is transmitted to the lens assembly together with the operand "changed word length= 10 (initial communication)" (Steps S15 and S16).

In a case where the camera assembly A and the lens assembly D are combined with each other, since the number of controllable units, n, is 2, the number of words for control communication is ten as in the case of initial communication. In such a case, although it is unnecessary to use the word length change command, it is apparent that there is no problem even if the word length change command together with the operand "changed word length=10" is employed. It is, therefore, unnecessary to apply a special change to system control.

FIG. 5(b) is a flowchart showing the camera assembly B, and unlike the camera assembly A of FIG. 5(a) the camera assembly B is provided with only the function of controlling the AE unit. Accordingly, if the camera assembly B is combined with the lens assembly C or D, the number of communication words for providing control is six.

Accordingly, control for the camera assembly B consists of a process in which Steps S4, S5, S8, S9, S12 and S14 are omitted from the flowchart of FIG. 5(a), the steps being related to a request for transmission of the unit specifications of the AF and AZ units as well as to control of them. Since the other steps are similar, the same reference numerals are used to denote the corresponding steps and explanation thereof is omitted.

FIG. 5(c) shows in common flowchart form the communication processing executed in the lens assemblies C and D.

The lens assembly (C or D) starts its operation and performs initial processing (Step S21). Then, the lens assembly waits for initial communication with the number of words for initial communication (=10) retained (Step S22). The lens assembly transmits to the camera assembly data corresponding to an initial communication command or control communication command which has been received from the camera assembly. If the lens assembly receives the initial communication command from the camera assembly, the lens assembly transmits to the camera assembly data corresponding to the contents of the initial communication command (Steps S23 and S24). If the control communication command has been transmitted from the camera assembly, the lens assembly transmits to the camera assembly data indicative of the state of a unit corresponding to the control information (Steps S25 and S26).

The above-described flow is repeated until a word length change command is transmitted to the lens assembly, thereby executing control of the unit in the lens assembly.

If the word length change command is transmitted to the lens assembly, the lens assembly sets its operand to a changed word length and waits for subsequent communication with the operand corresponding to the changed word length being retained. Accordingly, even if the word length is changed during an operation, the communication can be continued without malfunction. In addition, it is possible to quickly change the word length without confusing the microcomputer to disturb control.

The foregoing is a description of an interchangeable-lens type camera system according to the first embodiment. In the present inventive camera system, it is to be noted that every kind of operation of a lens assembly is processed for each unit and each function can be independently achieved in the lens assembly.

The arrangement of each unit in the lens assembly can be rendered identical with respect to a camera assembly irrespective of the function of the unit. More specifically, in the present inventive camera system having an interchangeable lens assembly, even if the extension of a function is implemented in the future, it is possible to achieve so-called upper compatibility with respect to an existing type of lens/camera system by executing processing in each unit. Such a case will now be explained below with reference to FIG. 7.

Figure 7:
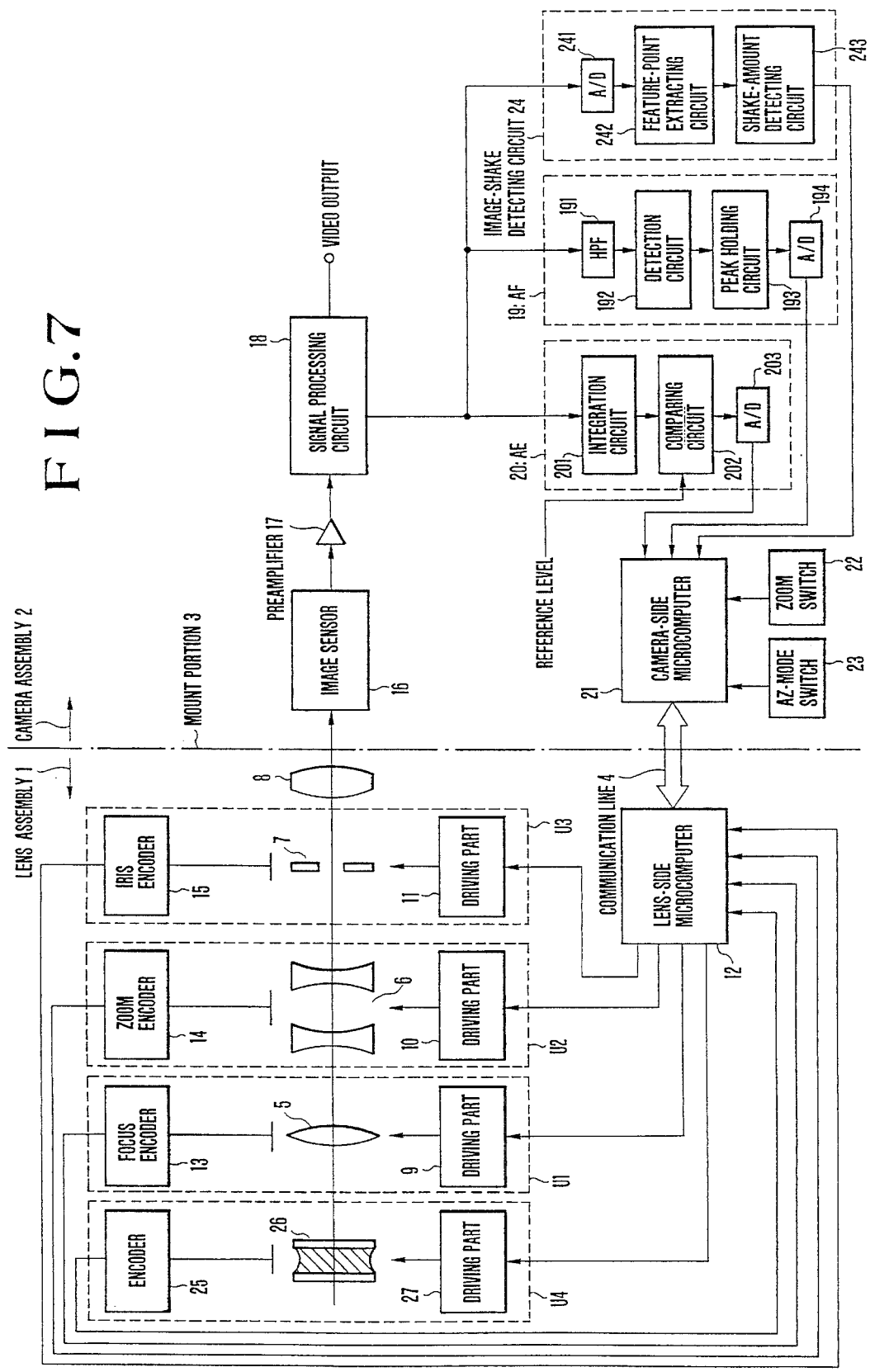
FIG. 7 is a block diagram showing a second embodiment in which an image-stabilizing unit is added to the system arrangement of FIG. 6.

In FIG. 7, AF, AE and AZ units are denoted by U1 to U3, respectively, and the same reference numerals are used to denote the same elements as those shown in FIG. 6.

FIG. 7 is a block diagram showing a camera/lens system provided with a unit U4 having a new function which may be achieved by the development of a new technology or extension to another function or the like. In a second embodiment, an AS (auto-stabilizing) unit is newly incorporated which is arranged to detect a camera shake, vary the optical axis of an optical system in accordance with the amount of camera shake, and cancel a shake.

The camera assembly 2 is provided with an image shake detecting circuit 24 for detecting the amount of shake of an image in a video signal. The amount of shake of the image, which is detected by the image shake detecting circuit 24, is supplied to the camera-side microcomputer 21, where it is converted into a predetermined data format. The output from the microcomputer 21 is transmitted to the lens-side microcomputer 12 over the communication line 4.

The image shake detecting circuit 24 comprises an A/D converter 241 for effecting A/D conversion of a video signal, a feature-point extracting circuit 242 for extracting a feature point of an image from the digitized video signal, and a shake-amount detecting circuit 243 for detecting, at intervals of a field period, the variation of the feature point extracted by the feature-point extracting circuit 242, thereby detecting the behavior of the feature point, that is, the amount of shake.

The lens assembly 1 includes an element 26 which is built therein to achieve an auto-stabilization function, for example, a variable angle prism. The variable angle prism comprises two spaced parallel glass sheets and a liquid of silicone or the like, hermetically enclosed therebetween, and is arranged to vary the direction of the optical axis by relatively varying the angle between the glass sheets. The lens assembly 1 also includes a driving part 27 for driving the variable angle prism 26, and an encoder 25 which serves as detecting means for detecting the operating state of the variable angle prism 26.

The driving part 27 for the newly added unit U4 is driven and controlled on the basis of control information supplied from the camera assembly 2 over the communication line 4 by the microcomputer 12. The operating state of the driving part 27 of the new unit U4 is detected by the operation-detecting encoder 25, and is then read into the lens-side microcomputer 12, where it is subjected to predetermined processing as required. The result is transmitted to the camera assembly 1 over the communication line 4. With the above-described arrangement, it is possible to add a new function to the lens/camera system irrespective of the presence or absence of another unit or without influencing or being influenced by the operation thereof.

Figure 8:
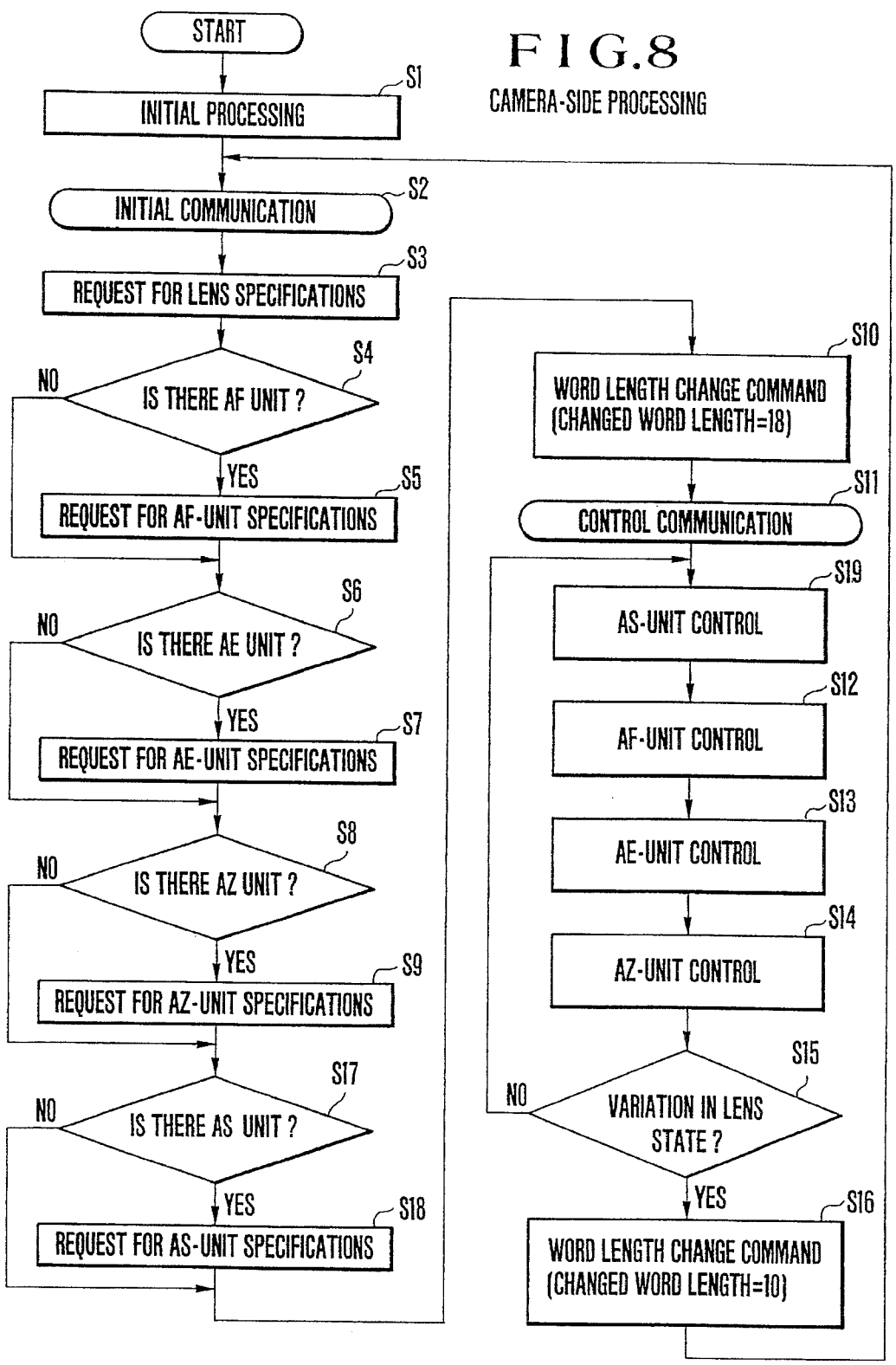
FIG. 8 is a flowchart showing the control operation of the embodiment of FIG. 7.

FIG. 8 is a flowchart showing the control operation used in the second embodiment, and is substantially identical to the flowchart of FIG. 5(a) except that control steps for the auto-stabilization unit U4 are newly added.

The new steps are inserted between Steps S9 and S10 and before Step S12. In Step S17, it is determined whether an AS unit is included in the lens assembly 1. If it is determined that an AS unit is present, the transmission of the specifications of the AS unit is requested in Step S18. In Step S19 before Step S12, control of the AS unit is executed. Since the other steps are as described above, a description thereof is omitted.

In the above-described case, it is to be noted that the number of units in the lens assembly is four and the changed number of words given in Step S10 is, therefore, two words for a header part and sixteen (4×4) control words—a total of eighteen words.

In accordance with the above-described second embodiment, in an arrangement in which each function of a lens assembly is controlled from a camera assembly, each function of the lens assembly is realized by a unit which includes a part for providing a desired function, a driving system, and detecting means for detecting the operating state of the functional part. The camera assembly transmits control information on each of the units to the lens assembly by serial communication, whereby each of the units of the lens assembly can be separately controlled in accordance with the control function of the camera assembly and the function of the lens assembly combined therewith.

With the above-described arrangement, the control information associated with each unit to be controlled in a lens assembly and detection information indicative of the driven state thereof can be readily independently communicated between the camera and lens assemblies irrespective of the number or kinds of units. Accordingly, it is possible to completely assure compatibility with respect to various lens assemblies including different numbers of units to be controlled.

Further, according to the above-described embodiment, by using a word length change command in the control communication provided between camera and lens assemblies, it is possible to achieve smooth communication without causing a malfunction of the system or without the need to consume unnecessary processing time even if the number of communication words, the mode of communication or the like is changed.

Accordingly, it is possible to achieve a system provided with optimum communication word lengths for various combinations having different functions without the need to increase the amount of processing on a camera side and a lens side or without the requirement of excessively high throughputs on the lens side, that is, without the risk of causing an increase in the cost of a lens-side processing unit such as a microcomputer.

A third embodiment of the camera system according to the present invention will be described below with reference to FIGS. 9 to 13.

In this kind of interchangeable-lens system, since lens and camera assemblies can be freely attached to and detached from each other, it is necessary to realize the communication of each kind of control information and detection information between the control means of the camera assembly and the driving means of the lens assembly.

Typical examples of such an interchangeable lens system will be described below with reference to FIGS. 12 and 13.

Figure 12:
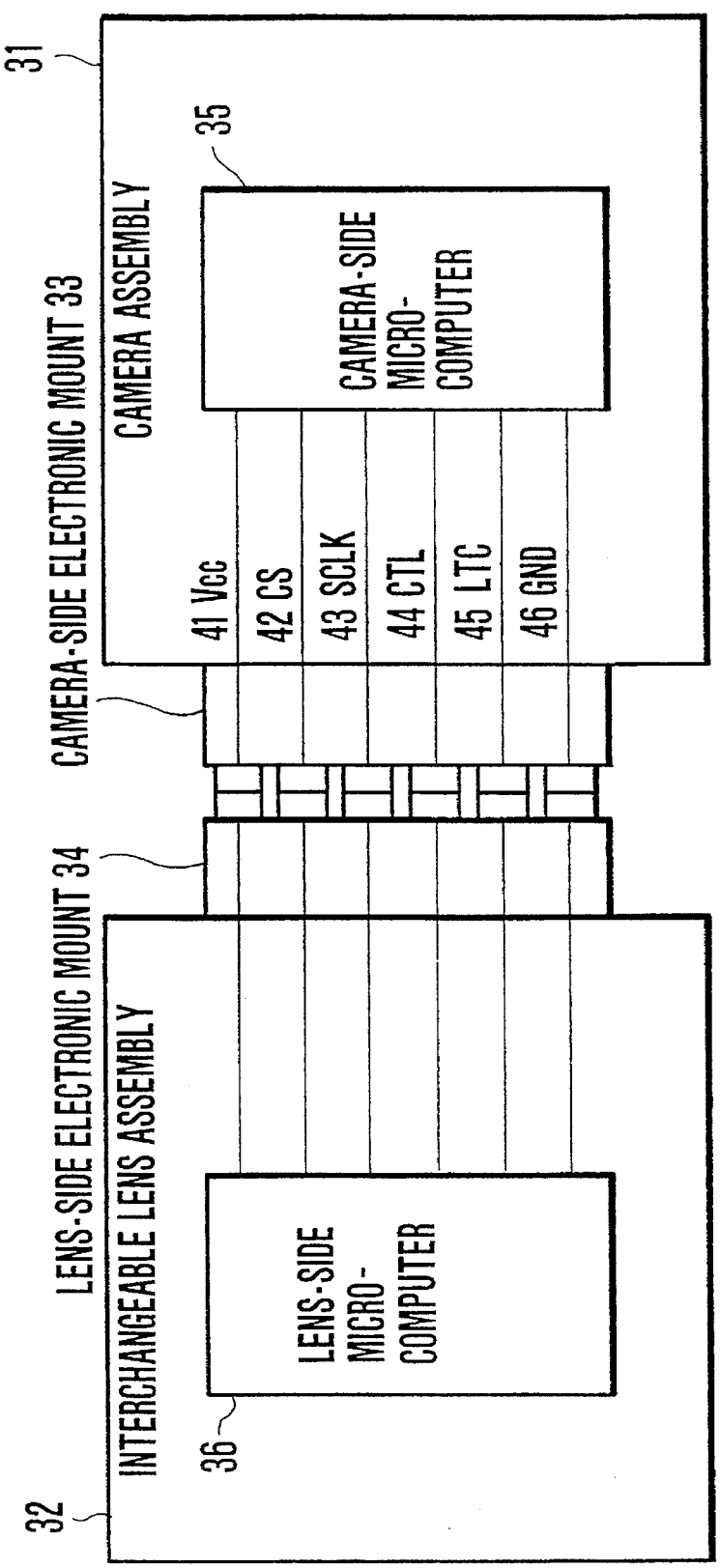
FIG. 12 is a block diagram which shows an interchangeable lens system in which a lens assembly including no target to be controlled by a camera assembly is combined therewith.

FIG. 12 is a block diagram schematically showing the arrangement of a general interchangeable lens system.

Referring to FIG. 12, a camera assembly and an interchangeable lens assembly are denoted by 31 and 32, respectively. The camera assembly 31 includes a camera-side electronic mount 33 and a camera-side microcomputer 35 (hereinafter referred to as a "camera microcomputer 35"), while the lens assembly 32 includes a lens-side electronic mount 34 and a lens-side microcomputer 36 (hereinafter referred to as a "lens microcomputer 36"). In the drawing, reference numeral 41 denotes a power source line Vcc, reference numeral 42 denotes a chip select signal CS, reference numeral 43 denotes a synchronizing signal SCLK (serial clock) for a communication path, reference numeral 44 denotes data CTL (camera to lens) transmitted from the camera microcomputer 35 to the lens microcomputer 36, reference numeral 45 denotes data LTC (lens to camera) sent back from the lens microcomputer 36 to the camera microcomputer 35, and reference numeral 46 denotes a ground line GND.

A video camera such as the camera system of FIG. 2 has the following arrangement- It is assumed here that the interchangeable lens assembly 32 of the type which does not include any device to be electronically controlled and driven by the camera assembly 31, such as an auto-focus device, an auto-iris device or a zooming device, is connected to the camera assembly 31. To provide data communication with the camera assembly 31 even if the interchangeable lens assembly 32 includes no device to be electronically controlled, the interchangeable lens assembly 32 includes the lens microcomputer 36 which is arranged to transmit the data LTC indicating that electronic control is impossible to the camera microcomputer 35 through the electronic mounts 33 and 34.

Figure 13:
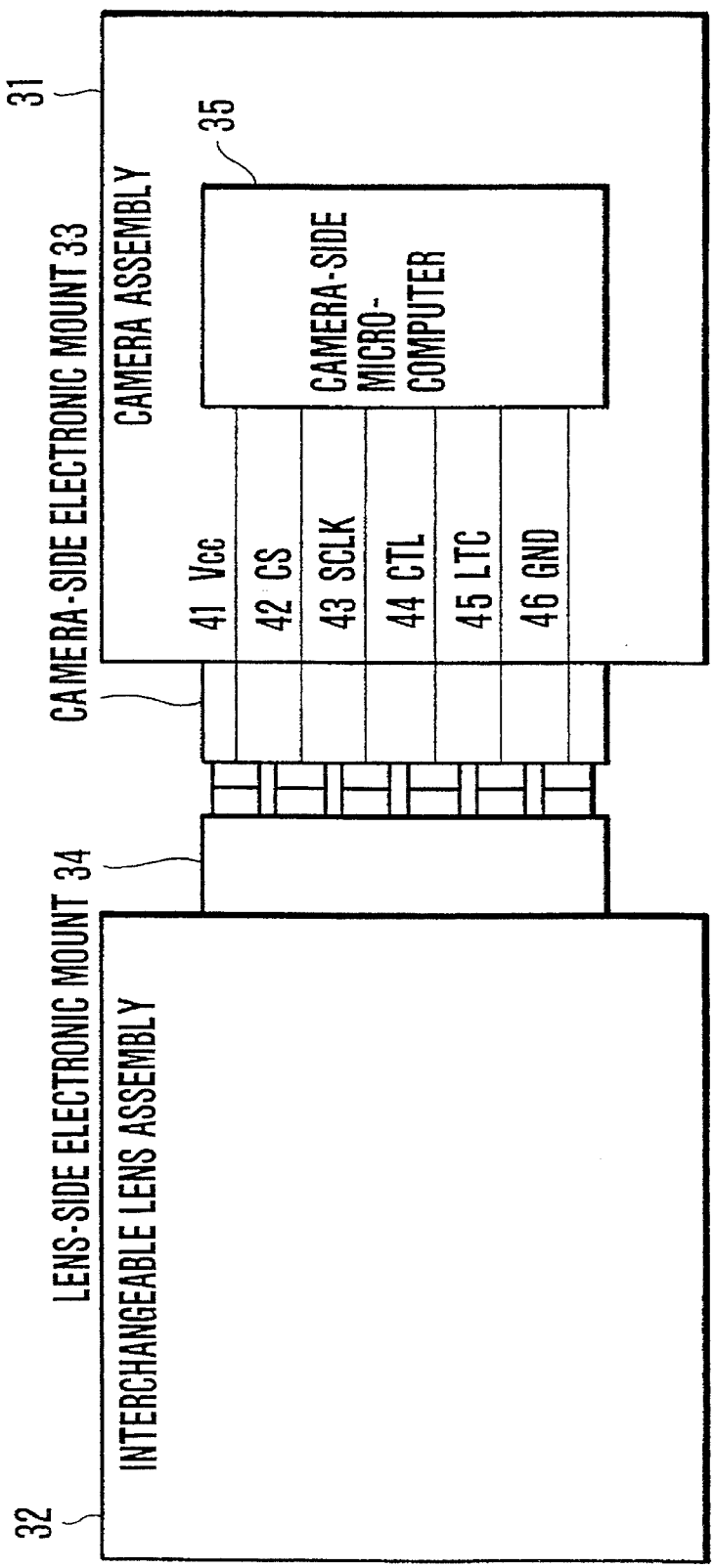
FIG. 13 is a block diagram which shows another interchangeable lens system in which a lens assembly including no target to be controlled by a camera assembly is combined therewith.

FIG. 13 is a schematic block diagram showing another form of interchangeable lens system, and illustrates an arrangement in which the interchangeable lens assembly 32 includes neither the lens microcomputer 36 nor any device to be controlled by the camera microcomputer 35.

In such an arrangement, the camera microcomputer 35 continues to transmit the chip select signal 42, the serial clock SCLK 43 and the data CTL 44 until the lens assembly 32 starts communication utilizing the data LTC 45. As a result, a considerable loss of time occurs in the processing of the camera microcomputer 35 until it is determined that communication is impossible.

For the above-described reason, in the case of the arrangement shown in FIG. 12, in order to transmit to the camera assembly a signal indicating that electronic control is impossible, it is necessary to incorporate the lens microcomputer 36 and peripheral electronic circuitry even in an electronically uncontrollable lens assembly which does not include any driving means to be controlled by the camera assembly. Such necessity is extremely disadvantageous in terms of space and cost savings.

The arrangement of FIG. 13, in which the lens microcomputer 36 is not incorporated in the lens assembly 32, does not include means for detecting that the lens microcomputer 36 is not present in the lens assembly 32. As a result, the camera microcomputer 35 must consume time to perform unnecessary processing.

The third embodiment has been devised in order to solve the above-described problems.

One aspect of the third embodiment pertains to an interchangeable lens system which comprises a camera assembly; a lens assembly which can be detachably attached to the camera assembly; communication means for providing communication of control information between the camera assembly and the lens assembly, driving means in the lens assembly being controlled from the camera assembly through the communication means, and reply means for sending the control information back to the camera assembly as reply information indicating that there is no target to be controlled, if the lens assembly does not include any driving means corresponding to the control information supplied from the camera assembly.

Another aspect of the third embodiment pertains to a lens assembly which can be detachably attached to a camera assembly and which comprises reply means for sending control information back to the camera assembly as information indicating that there is no target to be controlled, if the lens assembly does not include any driving means corresponding to the control information supplied from the camera assembly.

Another aspect of the third embodiment pertains to a camera assembly to which a lens assembly can be detachably attached and which comprises communication means for transmitting to the lens assembly control information required to drive driving means in the lens assembly, and for receiving reply information sent back from the lens assembly, and control means for omitting control associated with the driving means, if the communication means receives from the lens assembly reply information indicating that the lens assembly includes no driving means corresponding to the control information.

Another aspect of the third embodiment pertains to a control system which comprises a master-side unit, a slave-side unit which can be detachably attached to the master-side unit, communication means for providing communication of control information between the master-side unit and the slave-side unit, driving means in the slave-unit side being controlled from the master-side unit through the communication means, and reply means for sending communication data supplied from the master-side unit directly back to the same as reply information indicating that there is no target to be controlled, if the slave-side unit does not include any target to be controlled corresponding to the control information supplied from the master-side unit.

In the interchangeable lens system having the above-described arrangement, if the lens assembly does not include a control device, communication data transmitted from the camera assembly is directly sent back to the same. In this arrangement, the communication between the camera assembly and the lens assembly can be accomplished to inform the camera assembly that the lens assembly does not include any target to be controlled, without the need to incorporate any microcomputer in the lens assembly. In consequence, it is possible to eliminate the problem that it has been necessary to provide a microcomputer in a lens assembly which does not include any target to be controlled or that a camera assembly continues to transmit data without being able to detect the presence or absence of a target to be controlled in the lens assembly. Accordingly, it is possible to achieve smooth and rapid control.

The interchangeable lens system according to the third embodiment will be described in detail with reference to associated drawings.

Figure 9:
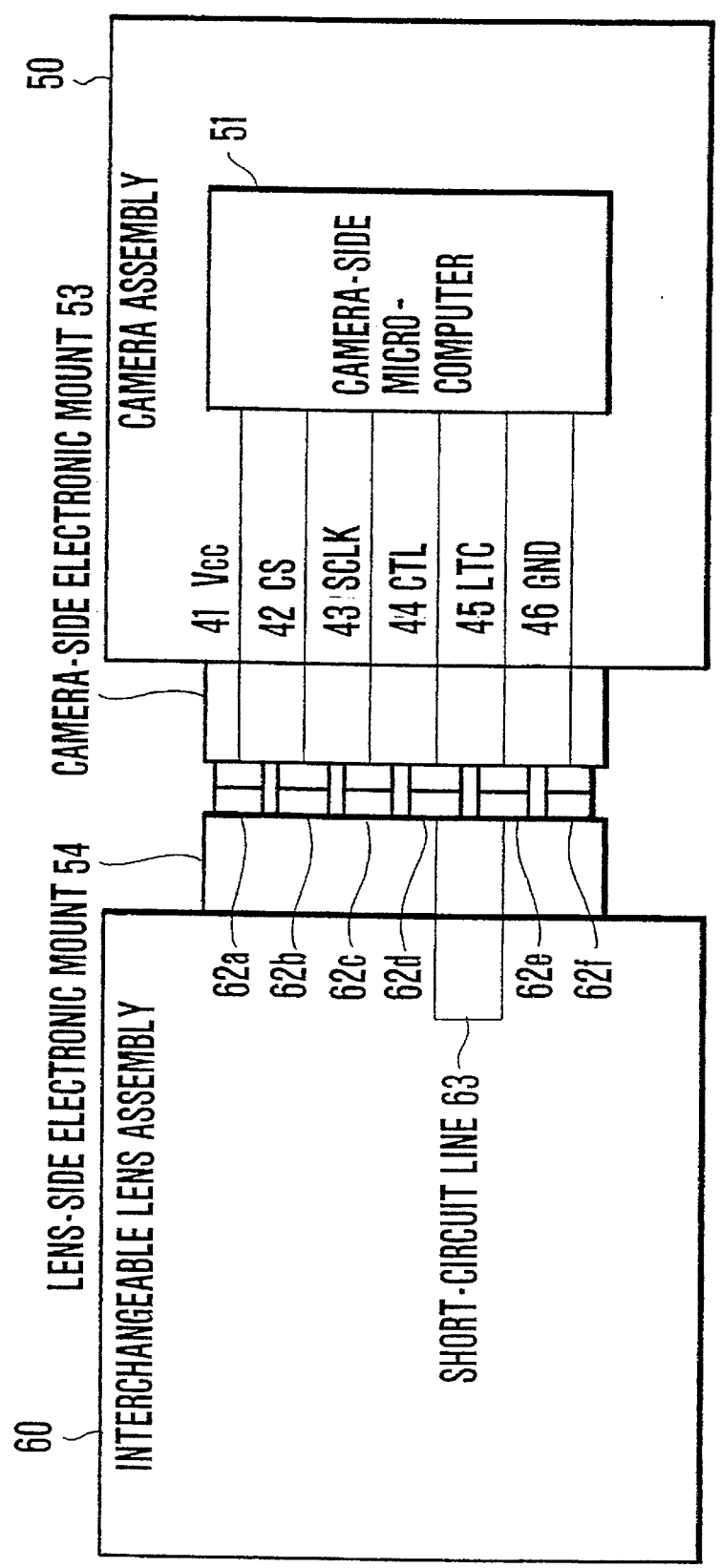
FIG. 9 is a block diagram showing the arrangement of an interchangeable lens assembly according to a third embodiment of the present invention.

FIG. 9 schematically shows the interchangeable lens system according to the third embodiment.

Referring to FIG. 9, a camera assembly 50 includes a control microcomputer 51 for outputting the control information required to control each target to be controlled within a lens assembly, such as an auto-focus unit, an auto-iris unit or a zooming unit, and an electronic mount 53 provided with an electrical contact for permitting data communication with the lens assembly.

The electronic mount 53 is provided with a terminal 41 for the power source line Vcc, a terminal 42 for the chip select signal CS, a terminal 43 for a serial clock SCLK serving as a synchronizing signal for a communication path, a terminal 44 for data CTL (camera to lens) for transmission from camera microcomputer to lens microcomputer, a terminal 45 for data LTC (lens to camera) for transmission from lens microcomputer to camera microcomputer, and a grounding terminal GND 46.

A lens assembly 60 is detachably attached to the camera assembly 50, and includes neither a target to be controlled, such as an auto-focus unit, an auto-iris or an zooming unit, nor a microcomputer.

The lens assembly 60 is provided with a lens-side electronic mount 54 which can be connected to the camera-side electronic mount 53 of the camera assembly 50. The electronic mount 54 is provided with terminals 62a to 62f which are respectively connected to the terminal 41 for the power source line Vcc, the terminal 42 for supply of the chip select signal CS, the terminal 43 for supply of the serial clock SCLK serving as a synchronizing signal for a communication path, the terminal 44 for reception of the data CTL (camera to lens) transmitted from camera microcomputer to lens microcomputer, the terminal 45 for reception of the data LTC (lens to camera) transmitted from lens microcomputer to camera microcomputer, and the grounding terminal GND 46. In the lens-side electronic mount 54, it is to be noted that a line 63 forms a short-circuit between the terminal 62d connected to the terminal 44 for transmission of the data CTL and the terminal 62e connected to the terminal 45 for transmission of the data LTC.

Accordingly, if the camera microcomputer 51 transmits data to the lens assembly 60 through the CTL terminal 44, since the line 63 forms the short-circuit between the CTL terminal 45 and the LTC terminal 46, the camera microcomputer 51 receives the output data CTL as the data LTC.

A control algorithm is set in such a manner that if the camera microcomputer 51 analyzes the data LTC and determines that the data CTL has been received as the data LTC, it is determined that there is no target which can be controlled in the lens assembly. Even if the lens assembly is not provided with a microcomputer, the camera assembly can rapidly find the arrangement of the lens assembly.

The timing of the control operation of the system according to the third embodiment will be described in detail with reference to FIG. 10.

Figure 10:
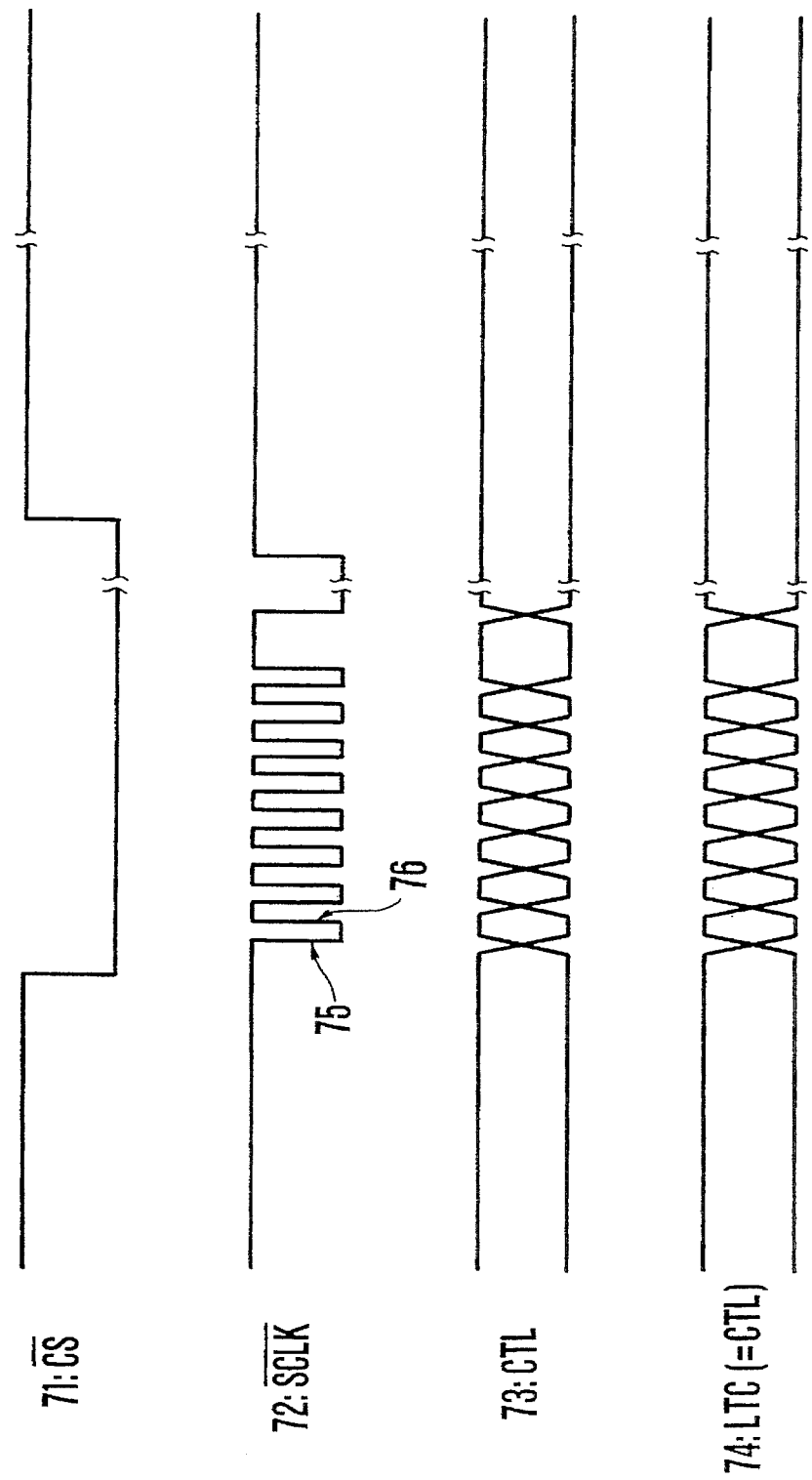
FIG. 10 is a timing chart which serves to illustrate the operation of the third embodiment.

FIG. 10 is a timing chart showing a case where the data CTL is directly sent back to the camera side over the short-circuit line 63 of the lens-side electric mount 54, that is, the case of CTL=LTC.

In FIG. 10, reference numeral 71 denotes a chip select signal CS which serves as a trigger signal to start communication, reference numeral 72 denotes a serial clock SCLK which serves as a synchronizing signal for communication, reference numeral 73 denotes the data CTL for transmission from camera microcomputer to lens microcomputer, reference numeral 74 denotes the data LTC obtained by sending back the data CTL over the short-circuit line 63 in an interchangeable lens assembly, reference numeral 75 denotes the falling timing of the serial clock SCLK, and reference numeral 76 denotes the rising timing of the serial clock SCLK.

The camera microcomputer 51 generates the rising edge of the chip select signal CS 71 to start communication with a lens microcomputer. When a certain predetermined time passes, the camera microcomputer 51 starts to transmit the synchronizing signal SCLK 72 and the data CTL 73. At this time, the camera microcomputer 51 starts to output the data CTL 73 at the falling timing 75 of the signal SCLK 72, and receives the data LTC 74 at the rising timing 76 of the signal SCLK 72. As can be seen from FIG. 10, the data LTC 74 is the data CTL 73 which has been directly sent back. Accordingly, the contents of the data LTC 74 are completely the same as those of the data CTL 73, that is, the camera microcomputer 51 receives the data which it has just transmitted.

As described above, the camera microcomputer 51, to which is connected an interchangeable lens assembly of the type which sends back the data LTC as the data CTL, needs to have an algorithm which can discriminate between the data LTC and the data CTL.

Figure 11:
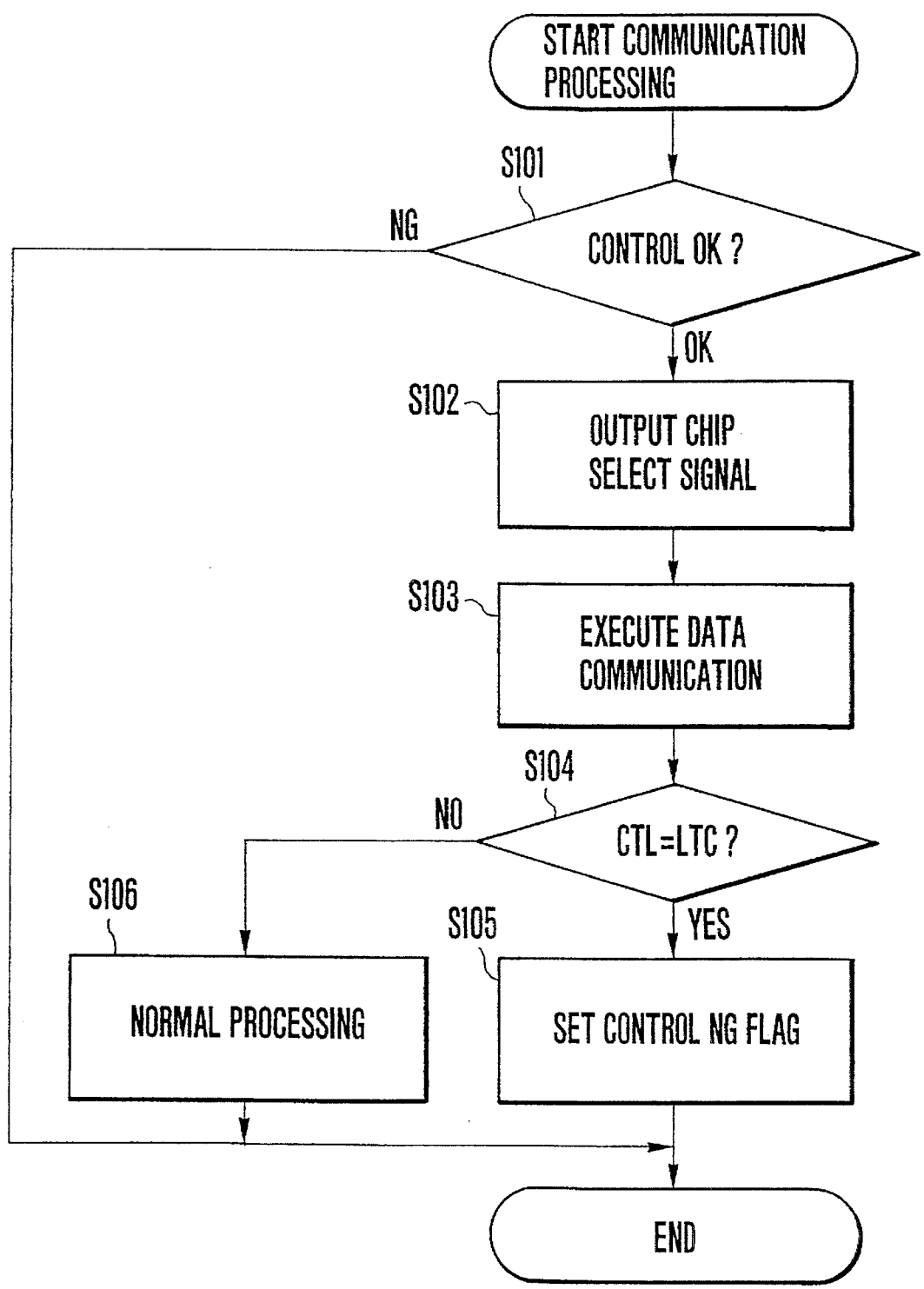
FIG. 11 is a flow chart which serves to illustrate the operation of the third embodiment.

FIG. 11 is a flowchart showing one example of a control algorithm for the camera microcomputer 51, which is arranged to determine that a lens assembly includes no target which can be controlled from a camera side, if the data LTC identical to the data CTL has been received.

In the flowchart of FIG. 11, when communication processing is started, the process proceeds to Step S101, where the camera microcomputer 51 examines a flag to determine whether a connected lens assembly can be controlled. If it is determined that the lens assembly cannot be controlled, the microcomputer 51 terminates the communication processing, that is, it is determined that the lens assembly cannot be used in combination with the camera assembly. If it is determined in Step S101 that the lens assembly can be controlled, the process proceeds to Step S102, where the chip select signal CS is outputted to the lens side.

Subsequently, in Step S103, data is transmitted to the lens microcomputer (at the start of communication, initial communication is executed on the assumption that the lens microcomputer is present).

In Step S104, it is determined that the signal CTL transmitted to the lens side is identical to the LTC information sent back from the lens side.

If it is determined that the transmitted data CTL differs from the received data LTC, that is, CTL≠LTC, the camera microcomputer 51 terminates the communication processing and analyzes the received data. Then, the camera microcomputer 51 executes normal processing for providing control corresponding to the received data and controls each target on the lens side by CTL communication.

In the normal processing, driving means associated with each of an auto-focus unit, an auto-iris unit and a zoom unit is controlled on the basis of the data CTL. (The communication timing in the normal processing will be apparent with reference to, for example, the first embodiment.) Since the normal processing does not constitute a feature of the third embodiment, a detailed description thereof is omitted.

If it is determined in Step S104 that the CTL is equal to the data LTC, that is, the data CTL is sent back as the data LTC over the short-circuit line 63 in the lens assembly, a control NG flag indicating that lens control is impossible is set up, and the communication processing is terminated.

Accordingly, even if a lens assembly having no lens microcomputer is employed, a loss of time will not occur since the camera assembly does not continue to transmit the data CTL while waiting for data to be sent back from the lens assembly. In addition, the internal arrangement of the lens assembly can be identified without the need to incorporate any lens microcomputer for transmitting data as a reply in a lens assembly which includes no target to be controlled.

Accordingly, in accordance with the interchangeable lens system according to the third embodiment, merely by providing a lens assembly with a line for providing a short-circuit between the CTL terminal and the LTC terminal, if it is determined in the first communication cycle that the LTC data is the same as the CTL data, the camera microcomputer 51 can be made to detect that the lens assembly includes no target to be controlled and stop its subsequent communication control.

As is apparent from the foregoing, the interchangeable lens system according to the third embodiment comprises a camera assembly and a lens assembly which can be detachably attached to the camera assembly, and is arranged in such a manner that, if the lens assembly does not include any unit controllable by the camera assembly, communication data supplied from the camera assembly is directly sent back to the camera assembly. Accordingly, it is not necessary to incorporate a microcomputer in a lens assembly which does not include a target to be controlled, and it is possible to inform the camera assembly that the lens assembly does not include a target to be controlled. It is, therefore, possible to prevent the camera assembly from continuing to transmit communication data until control comes to a halt.

As disclosed in the above-described third embodiment, a process for sending back communication data from a lens assembly to a camera assembly can be realized by forming an electrically short-circuit between the CTL and LTC terminals of the respective electronic mounts of the camera assembly and the lens assembly, sending back communication data supplied from the camera assembly directly to the camera assembly, and analyzing the sent-back data by means of the camera microcomputer. Accordingly, since the lens assembly does not need a lens microcomputer nor an electrical circuit, it is possible to advantageously reduce the internal mounting space and manufacturing cost of the lens assembly.

In addition, since the camera microcomputer is prevented from consuming time on unnecessary communication, it is possible to advantageously implement the formulation of an efficient algorithm for control software and a reduction in time consumption.

Although the third embodiment has been described with reference to the interchangeable lens system, the range of applications of the present invention is not limited to the same. For example, the present invention can be applied not only to various types of interchangeable lense systems irrespective of the presence or absence of electronic mounts, but also to every kind of system which is arranged to transmit information by serial communication.

A fourth embodiment of the present invention will be described below with reference to FIGS. 14 to 17(b).

The fourth embodiment pertains to imaging devices for video cameras or the like and is suitable for use in a video camera or the like which is provided with communication means for effecting communication of control information, particularly, between a control system and a target to be controlled. In particular, the fourth embodiment pertains to a control system for transmitting control information computed on a camera side therefrom to a lens side.

In recent years, video devices such as video cameras have been remarkably developing. As they have become more popular, their image quality and operability have been further improved and their sizes and weights have been reduced in spite of the extension of their functions.

As is known, various kinds of control are introduced to control the iris, focus and the like of the lens optical system of such a video device.

As an example, it is known that aperture control is provided by an automatic iris control (AE control) mechanism which controls an iris mechanism to keep constant the luminance level of a video signal. This kind of control usually forms a feedback loop to realize real-time processing.

Image memories have recently been becoming more inexpensive with the development of semiconductor technology, and the technique of digitally processing image signals has been making progress.

In such a circumstance, it has been proposed to employ the technique of realizing various kinds of image processing by photoelectrically converting image information obtained through an optical system into an image signal, temporarily storing the image signal in an image memory, applying digital processing to the image signal, and converting the digitally processed signal into an image signal.

In an imaging system utilizing the above-described technique, it is expected that AE control will also be achieved by such a digital processing technique. Accordingly, it will be possible to realize the technique of providing AE control on the basis of information on a specific part within a viewing screen (center-weighted light measuring technique) or the technique of computing the average of a plurality of parts within a viewing screen and providing AE control on the basis of the computation result (average light measuring technique). As a matter of course, if either of the techniques is executed, a corresponding processing time will be consumed.

In an ordinary one-piece system including camera and lens assemblies which are integrally combined, for example, its AE control system requiring a relatively long processing time is arranged to form a feedback loop in an analog manner on the basis of AE control information and individually control the iris mechanism of the lens assembly. For this reason, a time delay derived from various kinds of control such as digital processing is not a serious problem.

In order to improve the operability and performance of video cameras and to incorporate a larger number of functions into each individual video camera, interchangeable-lens types of video cameras have recently been proposed. In such an interchangeable lens system, a lens assembly and a camera assembly are detachably connected to each other, with the result that the communication of various kinds of control information and detection information is needed between the control means of the camera assembly and the driving means of the lens assembly.

In general, the interchangeable lens system, in which various kinds of lens assemblies can be selectively detachably attached to a camera assembly, may simultaneously execute focus control (AF control) and zoom control as well as AE control as the occasion demands. It follows that a large amount of and numerous kinds of information are transmitted between the camera and lens assemblies.

To minimize the number of contacts or buses, control information is transmitted between the camera and lens assemblies by serial communication. Since the serial communication involves a communication operation and a processing thereof both of which require certain time duration, the response of the serial communication tends to be slower than that obtainable with a one-piece video camera including camera and lens assemblies which are integrally combined.

What is called a TV-AF system in which control is executed on the basis of image signal information has recently been widely used as one type of AF control. In many TV-AF systems, serial communication is usually executed between camera and lens assemblies in synchronization with a vertical synchronizing signal.

In the above-described system, the AF control is the most important feature in that communication timings are primarily governed by computation timings associated with the AF control.

In general, the timings of AF control and AE control are roughly synchronous, but their communication timings cannot always be regarded as synchronous.

In other words, it is highly likely that although the timing of the AF control is accurately synchronized with the communication timing, the time instant when computations on AE control are completed will lead or lag on the timing at which communication is started.

More specifically, there may be a case where the computations required for the AE control are completed at the timing of a certain vertical synchronizing signal and the AE control is performed using computed information based on information carried by the preceding stored image signal. The computations may not be completed at the timing of another vertical synchronizing signal and the AE control may be performed using computed information based on information carried by an image signal which was stored immediately before the preceding stored image signal.

If both cases are entangled, a signal indicating control information associated with a certain image signal may be ignored. It is sufficiently possible that the above-described problems will be encountered not only with the AE control but also if a plurality of processes or communication operations having different processing times are performed.

The fourth embodiment is intended to solve the above-described problems and pertains to a lens driving apparatus which comprises driving means for driving an optical system, photoelectric conversion means for converting into an electrical signal an image signal formed on its image-forming surface by the optical system, computation means for performing computations on the control information required to control the optical system, communication means for communicating information indicative of the result of the computations performed by the computation means to the driving means at a predetermined communication timing, and control means for controlling the communication means so that the communication means transmits to the driving means the information indicative of the result of the computations performed by the computation means in synchronization with a communication timing which follows the time of completion of the aforesaid computations.

Another aspect of the fourth embodiment pertains to a lens driving apparatus which comprises driving means for driving an optical system, photoelectric conversion means for converting into an electrical signal an image signal formed on its image-forming surface by the optical system, memory means for storing at least part of the output signal of the photoelectric conversion means, computation means for performing computations on the control information required to control the optical system, by using a digital signal stored in the memory means, communication means for communicating information indicative of the result of the computations performed by the computation means to the driving means in synchronization with a vertical synchronizing signal, and control means for controlling the communication means so that the communication means transmits to the driving means the information indicative of the result of the computations performed by the computation means in synchronization with a vertical synchronizing signal which follows the time of completion of the aforesaid computations.

With the above-described embodiment, even if a variation occurs in the time required to compute each kind of control information such as AE control information, the correspondence between computational information and information to be transmitted can be kept constant with respect to a lens side to be controlled. Accordingly, it is possible to achieve highly reliable control which is free from malfunction such as the transmission of partially omitted information or double transmission of the same information and which does not confuse a control operation.

One example in which a lens-controlling apparatus according to the fourth embodiment is applied to an interchangeable-lens type camera system comprising a detachable lens assembly and a camera assembly will be described below with reference to corresponding drawings.

Figure 14:
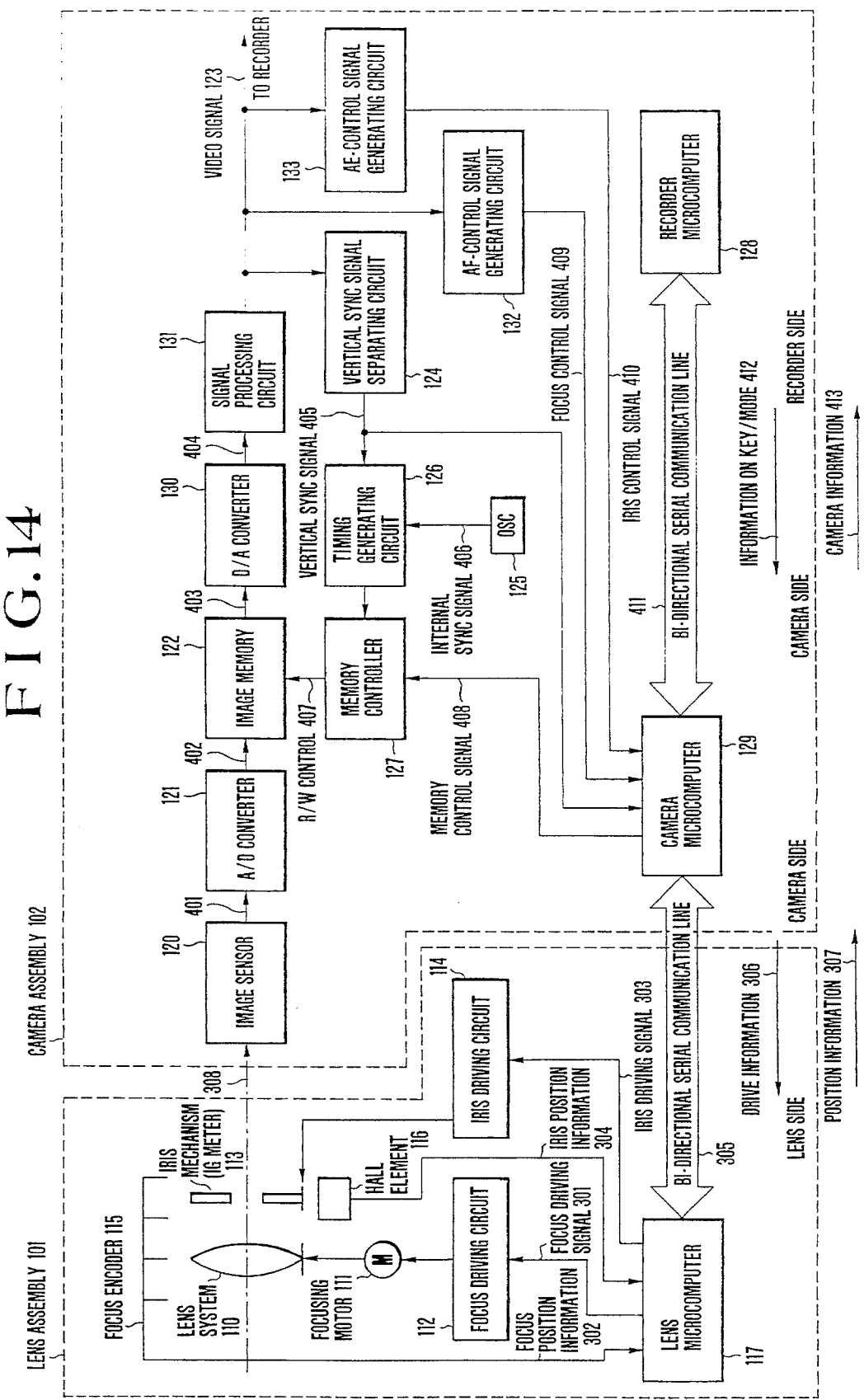
FIG. 14 is a block diagram showing one example in which a lens control apparatus according to a fourth embodiment of the present invention is applied to a video camera.

FIG. 14 is a block diagram showing the arrangement of the interchangeable-lens type camera system to which the lens-controlling apparatus according to the fourth embodiment is applied.

Referring to FIG. 14, a lens assembly is denoted by 101, and a camera assembly is denoted by 102. The camera assembly 102 may be a one-piece camera system in which a video camera is integrally combined with a video tape recorder (video cassette recorder).

The lens assembly 101 comprises a photo-taking lens system 110 including a focusing lens (not shown) for adjustment of focus, which is hereinafter referred to simply as a "focusing lens 110", a focusing motor 111 for driving the focusing lens 110 to control focusing, a driving circuit 112 for driving the focusing motor 111, an iris mechanism 113 including an iris for controlling the quantity of light to be transmitted through the lens assembly 101 and an actuator such as an IG meter for controlling the iris to change the state thereof, and a driving circuit 114 for driving the iris mechanism 113.

The lens assembly 101 also comprises a focus encoder 115 for detecting the movement and position of the focusing lens 110 and outputting focus position information, and a HALL element 116 serving as an iris encoder which detects the amount in which the lens assembly 101 is stopped down by the iris mechanism 113, that is, the stop position of the iris mechanism 113, and outputs iris position information.

The lens assembly 117 also comprises a control microcomputer (hereinafter referred to as a "lens microcomputer") 117 for globally controlling each kind of control in the lens assembly 101 in accordance with control information transmitted from the camera assembly 102. The microcomputer 117 outputs a focus driving signal 301 for driving the focusing lens 110 to the driving circuit 112 and an iris driving signal 303 for driving the iris mechanism 113 to the iris driving circuit 114. If the position of the focusing lens 110 or the iris of the iris mechanism 113 changes, the changed position of the focusing lens 110 or the iris is detected by the focus encoder 115 or the HALL element 116. The focus encoder 115 supplies the detection result to the lens microcomputer 117 as focus position information 302, while the HALL element 116 supplies the detection result to the same as iris position information 304.

In the above-described arrangement, the focusing lens 110 and the iris mechanism 113 are controlled in accordance with a command supplied from the camera assembly 102.

The camera assembly 102 comprises an image sensor 120, such as a charge-coupled device, for photoelectrically converting an optical signal 308 formed on an imaging surface thereof by the lens assembly 101 into an electrical image signal 401, an A/D converter 121 for converting an image signal (analog signal) 401 outputted from the image sensor 120 into a digital signal 402, and an image memory 122 for reading and storing the digital signal 402 outputted from the A/D converter 121. Timing control under which the digital signal 402 is read into the image memory 122 is provided by memory write control (write control) 407W. A memory controller 127 is controlled on the basis of either a vertical synchronizing signal 405 separated from a finally outputted video signal 123 by a vertical synchronizing signal separating circuit 124 or a timing signal formed by a timing generating circuit 126 on the basis of an internal synchronizing signal 406 generated by an oscillation circuit 125 built in the camera assembly 102.

The image signal stored in the image memory 122 is read as a digital signal 403 by providing read control 407R through the memory controller 127 on the basis of a timing signal generated in a manner similar to that used in the above-described write operation and on the basis of a memory control signal 408 formed through a controlling microcomputer (hereinafter referred to as a "recorder microcomputer") 128, incorporated in a video taper recorder (not shown), and through a camera controlling microcomputer (hereinafter referred to as a "camera microcomputer") 129. By modifying the process of reading from the image memory 122, various kinds of imaging effects can be realized.

The digital signal 403 read from the image memory 122 is restored to an analog signal 404 by a D/A converter 130. The analog signal 404 is converted into the normal video signal 123 through the predetermined signal processing executed by a signal processing circuit 131. The video signal 123 is supplied to a signal path of a recorder block (not shown).

The camera assembly 102 also comprises an AF control signal generating circuit 132 for forming from the video signal 123 a focus control signal (a signal made from, for example, a high-frequency component or an edge width which varies with the state of focus) 409 for providing auto-focus control(hereinafter called "AF control") and outputting the focus control signal 409, as well as an AE control signal generating circuit 133 for forming from the video signal 123 an iris control signal 410 for providing auto-exposure control (hereinafter called "AE control") and outputting the iris control signal 410. The AF control signal 409 and the AE control signal 410 are supplied to the camera microcomputer 129 for globally executing each kind of control over the camera assembly 102. The camera microcomputer 129 generates the drive control signal required to execute AF control and AE control of the drive system of the lens assembly 101 on the basis of the AF control signal 409 and the AE control signal 410 as well as key information and mode information transmitted from the recorder microcomputer 128 for executing global electrical control of the video tape recorder.

When the above-described control information is to be generated, the vertical synchronizing signal 405 separated by the vertical synchronizing signal separating circuit 124 is employed to specify a location on a viewing screen, that is, to set an area for detecting the required information on the viewing screen.

The transmission of various kinds of information between the camera assembly 102 and the lens assembly 101 will be described below.

The camera microcomputer 129 and the lens microcomputer 117 are connected to each other by a bi-directional serial communication line 305. Bi-directional serial communication is achieved in accordance with a certain timing determined by the vertical synchronizing signal 405 separated by the vertical synchronizing signal separating circuit 124.

More specifically, various kinds of control drive information 306 such as AF control information and AE control information are transmitted from the camera microcomputer 129 to the lens microcomputer 117. Various kinds of position information 307 such as lens position information and iris position information are transmitted from the lens microcomputer 117 to the camera microcomputer 129.

FIGS. 15(a) and 15(b) are flowcharts schematically representing the processing operation executed by the camera microcomputer 129 in the camera assembly 102. These flowcharts show the state of normal control executed after the completion of an initializing operation such as the operation of clearing an internal RAM or the setting of each register.

The camera microcomputer 129 executes each kind of control operation in synchronization with the timing of the vertical synchronizing signal 405. In the illustrated main routine S50, the camera microcomputer 129 waits for the vertical synchronizing signal 405 and starts its processing when it receives the vertical synchronizing signal 405 (Step S51). The camera microcomputer 129 sets a timer for fixing the time instant at which communication is to be started (Step S52). The camera microcomputer 129 allows a timer interrupt (Step S53) and transfers communication control to a timer interrupt routine S70.

In the main routine S50, the camera microcomputer 129 receives the AF control signal 409 from the AF control signal generating circuit 132 (Step S54). The camera microcomputer 129 performs computations for AF control on the basis of the data obtained as the AF control signal 409, each kind of position information obtained by the time of the preceding processing, and the key information and mode information supplied from the recorder microcomputer 128 (Step S55).

The camera microcomputer 129 then receives the AE control signal 410 from the AE control signal generating circuit 133 (Step S56), and performs computations for AE control on the basis of the data obtained as the AE control signal 409, each kind of position information obtained by the time of the preceding processing, and the key information and mode information supplied from the recorder microcomputer 128 (Step S57).

The camera microcomputer 129 has confirmed the completion of the timer interrupt routine (S70) for transmitting the control information required to execute each kind of control within the lens assembly 101 (Step S58). Then, the camera microcomputer 129 fetches each kind of position information on the focusing lens 110 obtained in this communication cycle (Step S59). In Step S60, the camera microcomputer 129 executes communication with the recorder, writes into the image memory 122 the image signal outputted from the image sensor 120, generates a control signal to be supplied to the memory controller 127 for controlling a read-out operation, outputs the memory control signal 408, and executes various other processes (Step S60). The camera microcomputer 129 returns to a standby state where it waits for the next vertical synchronization signal input (Step S51).

The timer interrupt processing shown as the timer interrupt routine (Step S70) is executed by causing an interrupt to occur after the timing which is introduced by the vertical synchronizing signal input in the main routine (S50). Accordingly, communication with the lens assembly 101 is immediately started (Step S71).

Thereafter, throughout the timer interrupt routine S70, the camera microcomputer 129 outputs an AF control signal (Step S72), outputs an AE control signal (Step S73), fetches the position information on the focusing lens 110 detected by the focus encoder 115 and the HALL element 116 (Step S74), and sets an interrupt end flag (Step S75), thereby completing the interrupt.

In a system of the type in which the communication of each kind of control information is performed by causing an interrupt in a main routine in the above-described manner, a timer interrupt routine and the main routine operate independently. Accordingly, it is necessary to take care of timing control in the case of particular internal processing times of the main routine.

FIG. 16 is a timing chart which serves to illustrate various timings introduced in the communication process executed in the system.

In FIG. 16, part (a) represents a vertical synchronizing signal, part (b) represents the timings of communication processes each of which is executed in accordance with the timing provided by the vertical synchronizing signal, and part (c) represents the timings of AF-data fetching and computing processes and those of AE-data fetching and computing processes.

As can be seen from FIG. 16, the timings at Which individual interrupts occur are not fixed since the time required for each computation is not necessarily fixed. For example, Pattern (P) represents a case where an interrupt occurs before the completion of AF computations, Pattern (Q) represents a case where an interrupt occurs after the completion of AF computations but before the completion of AE computations, and Pattern (R) represents a case where an interrupt occurs after the completion of AE computations.

As a result, in the worst case, it is likely that the timing of occurrence of such an interrupt may change in each communication cycle. If the timing changes, a particular data block may be transmitted twice or may not be transmitted to the lens assembly 101.

In Pattern (P) shown in FIG. 16, since the communication timing occurs before the completion of the AF and AE computations, a data block which is being computed cannot be transmitted. Therefore, the contents of a data block to be transmitted are AF and AE data blocks which were obtained from the preceding computations.

In Pattern (Q), since the communication timing occurs after the completion of the AF computations and before the completion of the AE computations, the contents of a data block to be transmitted are a new AF data block which is computed during the current vertical synchronization period and the preceding AE data block. This is because computations on a new AE data block have not yet been completed.

In Pattern (R), since the communication timing occurs after the AF and AE computations have been completed, the contents of a data block to be transmitted are the latest AF and AE data blocks obtained from the current computations.

If data communication is confused in the above-described manner, it may be impossible to provide accurate control.

Since AF control generally needs as fast response as possible, it is necessary to transmit to a focusing lens the result of computations based on the latest image signal. This necessity is an indispensable requirement for a video camera which is used to shoot a moving subject.

In contrast, AE control is not seriously influenced even if its timing shifts by one vertical synchronizing signal period or thereabouts.

Figure 17A:
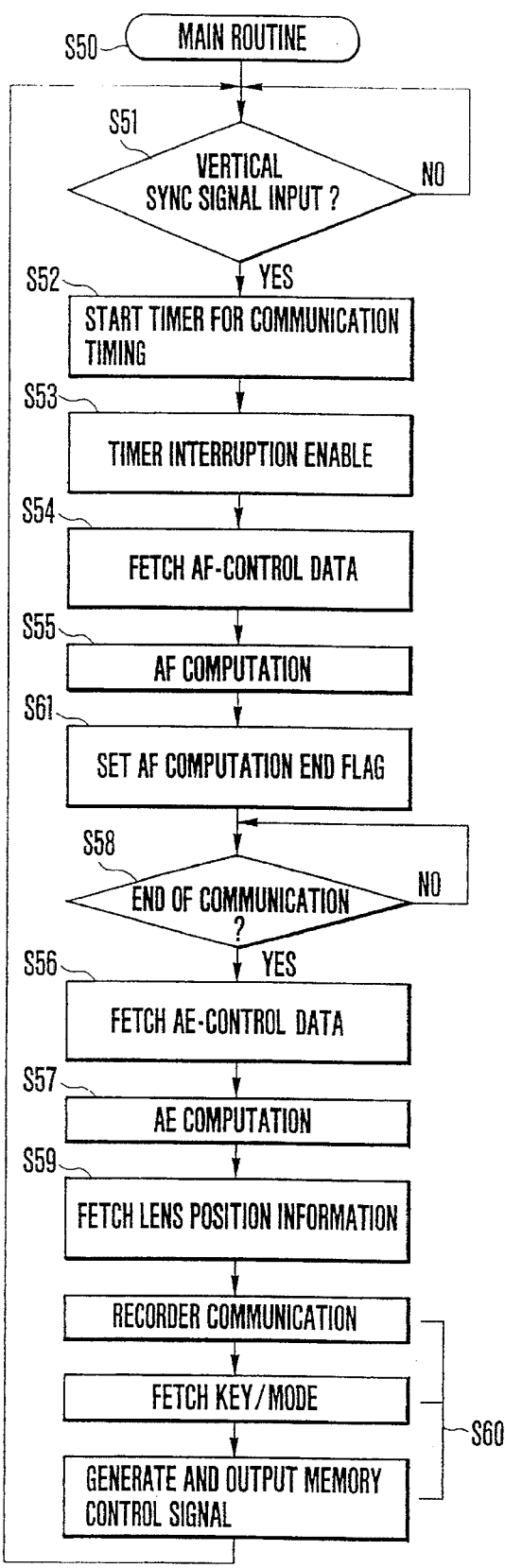
FIGS. 17(a) and 17(b) are flowcharts showing the internal processing of the camera microcomputer used in the fourth embodiment.
Figure 17B:
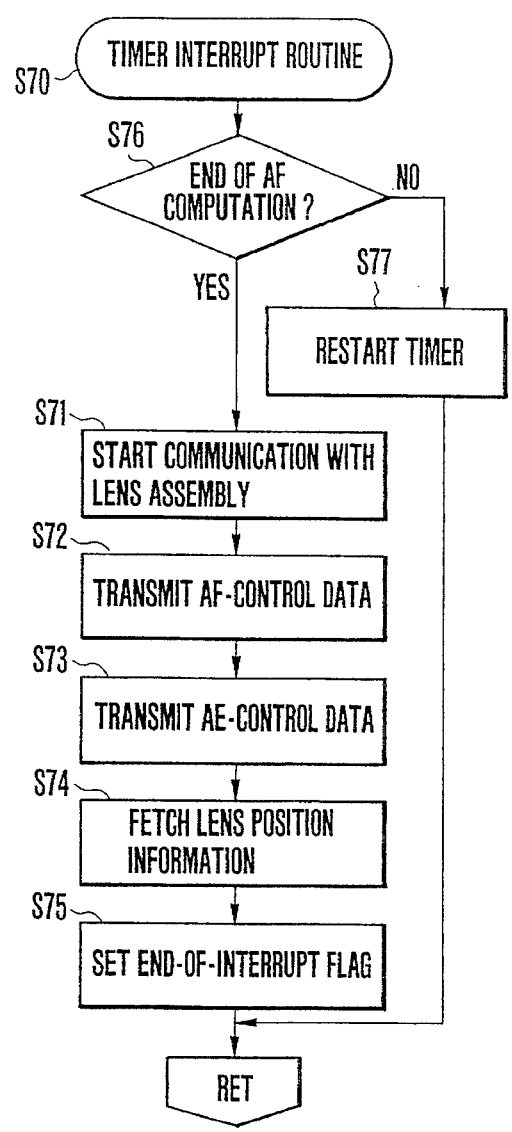

The processing showing in the flowcharts of FIGS. 17(*a*) and 17(*b*) is executed on the basis of the above-described characteristics.

In the flowcharts shown in FIGS. 17(*a*) and 17(*b*), the same reference numerals are used to denote steps which are the same as those shown in the flowcharts of FIGS. 15(*a*) and 15(*b*). The following explanation is focused on the difference between the main routine S50 and timer interrupt routine S70 shown in FIGS. 15(*a*) and 15(*b*) and those shown in FIGS. 17(*a*) and 17(*b*). In the main routine S50, after AF computations have been completed (Step S55), an AF computation end flag is set (Step S61).

Fetching of AE control data (Step S56) and AE computations (Step S57) is performed after the end of communication has been confirmed (Step S58).

In the timer interrupt routine (S70), if an interrupt occurs, an AF computation end flag is confirmed (Step S76). If the AF computations have not yet been completed, the timer is restarted without executing a communication process (Step S77). In case an timer interrupt is again caused by the timer, if the AF computations have not yet been completed, the timer is similarly restarted.

If a timer interrupt occurs after the completion of the AF computations, communication with the lens assembly 101 is started. In other words, the communication of control information is performed at a communication timing which follows the completion of predetermined kinds of computations.

The control information is not transmitted at a communication timing irrespective of whether AE control computations are completed before or after the communication timing. The control information is transmitted at a communication timing provided by a vertical synchronizing signal which follows the completion of the AE control computations. Accordingly, it is possible to reliably transmit and receive the control information.

With the above-described means, it is possible to reliably prevent the aforementioned double transmission of the same information and the transmission of partially omitted information, whereby it is possible to achieve consistently stable, highly reliable communication.

Although the transmission of AE control information is necessarily delayed by the period of one vertical synchronizing signal, it is possible to prevent the transmission of the control information from being shifted in time with respect to each communication timing and to prevent the continuity of the control information from being impaired.

In the above description, for the simplification of explanation, AF and AE control signals are each generated from a video signal once during the period of one vertical synchronizing signal. However, it is apparent that a method of generating AF and AE control signals n times during the period of one vertical synchronizing signal and obtaining an average or performing a certain kind of weighting computation can also be achieved by a process similar to that described above.

The fourth embodiment has been explained with reference to the example where the timing at which AE information is computed is not fixed with respect to each communication timing, but the range of applications of the present invention is not limited to such an example. For instance, the present invention can be advantageously applied to a system which performs a plurality of control communications and in which the variation of timing may occur between the timing at which communication is performed and the time required to compute control data.

As is apparent from the foregoing that, in accordance with the fourth embodiment, in a system of the type in which a target to be controlled, such as a lens assembly, is controlled from a camera assembly through communication, even if the time required to compute each kind of control information such as AE control information varies with respect to each communication timing, the relationship between the communication timing and data block to be transmitted can be kept constant. Accordingly, it is possible to achieve highly reliable control free from malfunction or an impairment in the continuity of control which may result from the transmission of partially omitted information or double transmission of the same information due to the discrepancy between the communication timing and the timing of completion of computations.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video camera device; comprising:
   (a) automatic focus adjusting means for automatically adjusting a focus to an image of an object;
   (b) image movement correcting means for correcting a movement of the image; and
   (c) control means for controlling operations of said automatic focus adjusting means and said image movement correcting means, said control means being arranged to effect control of said image movement correction means before control of said automatic focus adjusting means.

2. A device according to claim 1, wherein said control means is arranged to repetitively effect the controlling operation of said automatic focus a adjusting means and said image movement correcting means at a predetermined period.

3. A device according to claim 2, wherein said predetermined period is a V-sync.

4. A device according to claim 1, wherein said automatic focus adjusting means is arrange to drive a focusing lens so that a level of a high frequency component in an image signal becomes a peak and said image movement correcting means is arranged to detect a movement information of the image of the object to be photographed from said image signal and to correct the image movement by optical correcting means on the basis of said movement information.

5. A video camera according to claim 4, wherein said image movement correcting means includes a variable apex angle prism.

6. A device according to claim 1, further comprising exposure control means for effecting an exposure control so that a luminance level in the image signal is constant at a predetermined value.

7. A device according to claim 6, wherein said control means is arranged to repetitively effect the control at said predetermined period, of said image movement correcting means, automatic focus adjusting means and exposure control means, in this order.

8. A video camera system consisting of a lens unit and a camera unit, comprising:
   (a) the lens unit, including:
     (1) a focusing lens;
     (2) an image movement correcting optical system;
     (3) a diaphragm; and
     (4) lens control means for controlling the focusing lens, the image movement correcting optical system and the diaphragm on the basis of a control information fed from the camera unit and for transmitting status information of the focusing lens, the image movement correcting optical system and the diaphragm to the camera unit; and
   (b) the camera unit, including:
     (5) focus detecting means for detecting a focus state;
     (6) image movement detecting means for detecting a movement of an image;
     (7) light measuring means for detecting an exposure state; and
     (8) camera control means for computing a focus control information, an image movement correcting information and an exposure control information on the basis of outputs of said focus detecting means, said image movement correcting means and said light measuring means and said status information fed from said lens control means, respectively, and for feeding said image movement correcting information to said image lens control means before feeding the other information thereto on the basis of a predetermine data format.

9. A system according to claim 8, wherein said control means is arranged to repetitively effect control operations of said automatic focus control means and image movement correcting means at a predetermined period.

10. A device according to claim 8, wherein said lens control means and said camera control means are arranged to information transmission in bidirectional manner at a predetermined period.

11. A device according to claim 10, wherein said predetermined period is a V-sync.

12. A system according to claim 8, wherein said image movement correcting means includes a variable apex angle prism.

13. A system according to claim 8, wherein said lens control means is arranged to repetitively effect the control, at said predetermined period, of said image movement correcting means, automatic focus adjusting means and exposure control means, in this order.

14. A video camera device, comprising:
(a) image sensing means;
(b) focus detecting means for detecting a focus signal, which varies according to a focus state, from an image signal outputted from said image sensing means;
(c) exposure state detecting means for detecting an exposure state on the basis of a predetermined signal component in said image signal;
(d) image movement detecting means for detecting a movement of an image;
(e) focus control means for automatically adjusting a focus state on the basis of an output of said focus detecting means;
(f) exposure control means for controlling an exposure state on the basis of an output of said exposure state detecting means;
(g) image movement correcting means for correcting the movement of image on the basis of an output of said image movement detecting means; and
(h) data processing means for serially transmitting outputs of said image movement detecting means, said focus detecting means and said exposure state detecting means to said image movement correcting means, said focus control means and said exposure control means in successive manner according to a predetermined data format, said data processing means being arranged to effect transmission of the output of said image movement detecting means before transmission of the output of said focus detecting means and the output of said exposure control means.

15. A device according to claim 14, wherein said serial transmission is effected in synchronism with a V-synch.

16. A device according to claim 15, wherein said focus detecting means is arranged to drive the focusing lens so that a level of a high frequency component in an image signal forms a peak, and said image movement detecting means is arranged to detect a movement information of an object image from said image signal.

17. A device according to claim 16, wherein said image movement correcting means includes a variable apex angle prism.

18. A device according to claim 14, consisting of a camera body and a lens unit, wherein said focus detecting means, said exposure state detecting means and said image movement detecting means are disposed in said camera body, and said focus control means, said exposure control means and said image movement correcting means are disposed in said lens unit.

19. A camera apparatus, comprising:
(a) automatic focus adjusting means for automatically adjusting a focus to an object;
(b) movement correcting means for correcting a
of a photographing image caused by a relative movement between said object and said apparatus;
(c) control means for repetitively controlling said automatic focus adjusting means and said movement correcting means, said control means being arranged to transmit control information to said movement correcting means prior to transmitting control information to said automatic focus adjusting means for controlling an operation of said movement correction means and then to successively transmit focal point control information to said automatic focus adjusting means for controlling said automatic focus adjusting means in a predetermined sequence for controlling said automatic focus adjusting means and said movement correcting means.

20. An apparatus according to claim 19, further comprising image pickup means wherein the automatic focus adjusting means judges a focusing state from image pickup signals output from the image pickup means.

21. An apparatus according to claim 19, wherein the movement correcting means has detection means for detecting image movement information from among the image pickup signals and optical correction means for correcting the image movement according to a detection result by the movement detection means.

22. An apparatus according to claim 21, wherein the optical correction means is a variable apex prism.

23. An apparatus according to claim 19, wherein the control means controls the automatic focus adjusting means and the automatic exposure adjusting means repeatedly every one field period.

24. An apparatus according to claim 23, further comprising automatic exposure adjusting means wherein the control means controls the automatic focus adjusting means, the automatic exposure adjusting means and the movement correcting means repeatedly every one field period.

25. A camera apparatus; comprising:
(a) automatic exposure adjusting means for automatically adjusting an exposure condition;
(b) movement correcting means for correcting a movement of a photographing image caused by a relative movement between said object and said apparatus;
(c) control means for repetitively controlling said automatic exposure adjusting means and said movement correcting means, said control means being arranged to transmit a control information to said movement correcting means for controlling an operation of said movement correcting means and successively transmit an exposure control information to said automatic exposure adjusting means for controlling said automatic exposure adjusting means.

26. An apparatus according to claim 25, further comprising image pickup means, wherein the automatic exposure adjusting means detects an exposure state from a picked-up image signal by the image pickup means and controls the exposure state so as to maintain a consistent level of the image signal output from the image pickup means.

27. An apparatus according to claim 25, wherein the movement correcting means has movement detecting means for detecting information of image movement from among the picked up image signals and a variable apex prism for correcting the image movement according to a detection result by the movement detecting means.

28. An apparatus according to claim 25, wherein the control means controls the automatic exposure adjusting means and the movement correcting means repeatedly every one field period.

29. A camera apparatus, comprising:
(a) automatic focus adjusting means for automatically adjusting a focus condition to an object;
(b) movement correcting means for correcting a movement of a photographing image caused by a relative movement between said object and said apparatus;
(c) control means for repetitively controlling said automatic focus adjusting means and said movement correcting means, said control means being arranged to transmit a control information to said movement correcting means for controlling an operation of said movement correcting means and successively transmit a focus control information to said automatic focus adjusting means for controlling said automatic focus adjusting means in each sequence among a plurality of sequences for repetitively and successively controlling said automatic focus adjusting means and said movement correcting means.

30. An apparatus according to claim 29, further comprising image pickup means, wherein the automatic focus adjusting means judges a focal point state from among image picked up signals output from the image pickup means.

31. An apparatus according to claim 29, wherein the movement correcting means has movement detecting means for detecting information of image movement from among the picked-up image signals, and optical correction means for correcting the image movement according to detection result by the movement detecting means.

32. An apparatus according to claim 31, wherein the optical means is a variable apex prism.

33. An apparatus according to claim 29, wherein the control means controls the automatic focus adjusting means and the movement correcting means repeatedly every one field period.

34. An apparatus according to claim 33, further comprising automatic exposure adjusting means, wherein the control means controls the automatic focus adjusting means, the automatic exposure adjusting means and the movement correcting means repeatedly every one field period.

* * * * *

UNITED STATES PATENT AND TRADEMARK OFFICE
CERTIFICATE OF CORRECTION

PATENT NO. : 5,485,208
DATED : January 16, 1996
INVENTOR(S) : Toshiaki Mabuchi and Yoshikazu Nishikawa It is certified that error appears in the above-indentified patent and that said Letters Patent is hereby corrected as shown below:

On the title page, Item [57] ABSTRACT, line 1, change "control" to -- controls --.

Col. 1, line 14, change "Present" to -- present --.

Col. 8, line 33, change "part-11" to -- part 11 --.

Col. 8, line 58, change ".blanking" to -- blanking --.

Col. 11, line 49, change "kind;of" to -- kind of --.

Col. 16, line 39, change ".contents" to -- contents --.

Col. 20, line 5, change "FIG 2" to -- FIG 12 --.

Col. 20, line 6, change "arrangement-" to -- arrangement --

Col. 30, line 5, change "Which" to -- which --.

UNITED STATES PATENT AND TRADEMARK OFFICE
CERTIFICATE OF CORRECTION

PATENT NO. : 5,485,208
DATED : January 16, 1996
INVENTOR(S) : Toshiaki Mabuchi and Yoshikazu Nishikawa It is certified that error appears in the above-indentified patent and that said Letters Patent is hereby corrected as shown below:

Col. 32, line 17, after "focus" delete "a".

Col. 32, line 23, change "arrange" to -- arranged --.

Col. 34, line 9, after "a" insert -- movement --.

Signed and Sealed this

Thirtieth Day of July, 1996

Attest:

BRUCE LEHMAN

Attesting Officer

Commissioner of Patents and Trademarks